US007636675B1

(12) United States Patent
Cheng et al.

(10) Patent No.: US 7,636,675 B1
(45) Date of Patent: Dec. 22, 2009

(54) OPTIMIZED AUCTION COMMODITY DISTRIBUTION SYSTEM, METHOD, AND COMPUTER PROGRAM PRODUCT

(75) Inventors: Jie Cheng, Plymouth, MI (US); Jie Du, Bloomfield Hills, MI (US); Wei Fan, Westland, MI (US)

(73) Assignee: Power Information Network, LLC, Westlake Village, CA (US)

( * ) Notice: Subject to any disclaimer, the term of this patent is extended or adjusted under 35 U.S.C. 154(b) by 1232 days.

(21) Appl. No.: 10/632,799

(22) Filed: Aug. 4, 2003

Related U.S. Application Data

(63) Continuation of application No. 10/366,719, filed on Feb. 14, 2003, now abandoned.

(51) Int. Cl.
*G06Q 30/00* (2006.01)
(52) U.S. Cl. ....................................................... 705/26
(58) Field of Classification Search .................. 705/26, 705/27, 37
See application file for complete search history.

(56) References Cited

U.S. PATENT DOCUMENTS

| | | | | | |
|---|---|---|---|---|---|
| 6,032,125 | A | * | 2/2000 | Ando | 705/10 |
| 6,611,726 | B1 | * | 8/2003 | Crosswhite | 700/99 |
| 7,133,848 | B2 | * | 11/2006 | Phillips et al. | 705/400 |
| 7,343,355 | B2 | * | 3/2008 | Ivanov et al. | 705/400 |
| 2002/0082977 | A1 | * | 6/2002 | Hammond et al. | 705/37 |
| 2003/0140023 | A1 | * | 7/2003 | Ferguson et al. | 706/21 |
| 2003/0225654 | A1 | * | 12/2003 | Chavas et al. | 705/36 |

OTHER PUBLICATIONS

Bapna, Ravi; Goes, Paulo; Gupta, Alok; "Online Auctions: Insights and Analysis", Communications of the ACM, 2001.*
Beenstock, Michael; Szpiro, George; "Specification Search in Nonlinear Time-Series Models Using the Genetic Algorithm", Feb. 1999.*
Hahn, Jungpil; "The Dynamics of Mass Online Marketplaces: A Case Study of an Online Auction", Mar. 2001.*
Hortacsu, Ali; "Mechanism Choice and Strategic Bidding in Divisible Good Auctions: An Empirical Analysis Of the Turkish Treasury AuctionMarket", Nov. 2000.*
Klemperer, Paul; "Auction Theory: A Guide to the Literature", Journal of Economic Surveys, 1999.*
Wilcox, Ronald T.; "Experts and Amateurs: The Role of Experience in Internet Auctions"; Marketing Letters, Nov. 2000.*

(Continued)

*Primary Examiner*—Mila Airapetian
(74) *Attorney, Agent, or Firm*—Sterne, Kessler, Goldstein & Fox P.L.L.C.

(57) ABSTRACT

A commodity product distribution plan is used to instruct source sites as to how commodity products are to be distributed among target sites. Where the commodity products are to be sold at auction, a wide range of auction prices can be expected due to mixed models, model years, commodity attributes such as color or optional features, economic conditions, and the auction site location itself. Additional factors that contribute to realized auction prices include depreciation and interest rate costs as well as constraints on shipments and auction site capacities. The present invention provides forecast auction prices for the commodity products, taking these various factors into consideration. In this way, an optimized distribution planned aimed at maximizing the potential profit for the commodity products to be sold at auction is generated.

94 Claims, 18 Drawing Sheets

OTHER PUBLICATIONS

Cheng et al., "Vehicle Sequencing Based on Evolutionary Computation," IEEE Transactions on Evolutionary Computation, vol. 2, pp. 1207-1214 (1999).

Cheng et al., "Exploratory Data Modeling With Bayesian-Driven Evolutionary Search," IEEE Transactions on Evolutionary Computation, vol. 2, pp. 1385-1392 (2000).

* cited by examiner

Genetic Operators

- Selection
  - Randomly generates a new generation based on the fitness of the their parents

Genetic Operators

- Switch
  - Randomly selects $N_s$ genes from a genome
  - Randomly generates permutation of their auction sites

Genetic Operators

- Block Move
  - Randomly selects two positions $p_1$ and $p_2$ in a genome
  - switch two blocks starting at $p_1$ and $p_2$ with length of $N_b$

P1
| 1 | 2 | 5 | 3 | 2 | P2 4 | 7 | 9 | 1 | 5 | 6 | 1 |

| 1 | 4 | 7 | 3 | 2 | 2 | 5 | 9 | 1 | 5 | 6 | 1 |

FIG. 9

Genetic Operators

- Crossover
  - Randomly selects 2 genomes based on their fitness
  - Randomly selects a position in a genome and crossover the 2 genomes to form two new genomes

FIG. 11

Original Auction Vehicle Distribution Plan

Optimal vs. Original Distribution Plans

|  | Original ($) | Optimal ($) | Change ($) |
|---|---|---|---|
| *Profit* | 19,291,821 | 19,599,321 | 307,500 |
| *Auction Revenue* | 19,557,169 | 20,145,360 | 588,191 |
| *Shipping Cost* | (131,947) | (381,808) | (249,861) |
| *Time Value Cost* | (25,158) | (35,314) | (10,156) |
| *Volume Elasticity Cost* | (59,230) | (53,770) | 5,460 |
| *Shipping Waste Cost* | (49,013) | (75,147) | (26,134) |

FIG. 13

OPTIMIZED AUCTION COMMODITY DISTRIBUTION SYSTEM, METHOD, AND COMPUTER PROGRAM PRODUCT

BACKGROUND OF THE INVENTION

1. Field of the Invention

The present invention relates generally to commodity products and more particularly to plans for distributing the commodity products to auction sites such that the total net profit can be maximized.

2. Related Art

Billions of dollars are spent each year on retail sales and leases of various commodity products. Commodity products include a full range of merchandise such as computers, medical equipment, and automotive vehicles for example. In many cases, commodity products are initially leased. At the end of the lease term, the lessee has the option of purchasing the commodity product or returning it to the lessor. The numerous products coming off-lease have created a whole new industry rallied around the concept of remarketing. In its broadest terms, remarketing refers to the placement of previously used, sold, or leased commodity products back into the retail market. Before a commodity product finds itself offered for sale in the retail market, it often passes through a wholesale market. Auctions are a popular means for getting a commodity product back into the retail market. For example, at many auctions, off-lease vehicles are sold at wholesale prices to retail auto dealers. In turn, these retail auto dealers remarket the vehicles to retail customers. However, the place where a particular commodity product is presently located is not necessarily where it will be sold at retail. Accordingly, one key issue to the remarketing industry is commodity product distribution. More particularly, a need exists for generating plans to distribute commodity products in a manner designed to maximize profits.

SUMMARY OF THE INVENTION

A commodity product distribution plan is used to instruct source sites as to how commodity products are to be distributed among target sites. Where the commodity products are to be sold at auction, a wide range of auction prices can be expected due to mixed models, model years, commodity attributes such as color or optional features, economic conditions, and the auction site location itself. Additional factors that contribute to realized auction prices include depreciation and interest rate costs as well as constraints on shipments and auction site capacities. The present invention provides forecast of auction prices for the commodity products, taking these various factors into consideration. In this way, an optimized distribution plan aimed at the maximization of the potential profit for the commodity products to be sold at auction is generated.

BRIEF DESCRIPTION OF THE FIGURES

The accompanying drawings illustrate the present invention and together with the description, further serve to explain the principles of the invention and to enable a person skilled in the relevant art to make and use the invention. In the drawings, like reference numbers indicate identical or functionally similar elements. Additionally, the left-most digit(s) of a reference number identifies the drawing in which the reference number first appears.

FIGS. 6-10 illustrate exemplary genetic operators used to generate an optimal auction commodity distribution plan according to an embodiment of the present invention.

FIG. 11 illustrates an original auction vehicle distribution plan which is not optimal in terms of expected net profits.

FIG. 13 illustrates a comparison of the original auction vehicle distribution plan of FIG. 11 and the generated optimized auction vehicle distribution plan of FIG. 12.

DETAILED DESCRIPTION OF THE INVENTION

Figure 1:
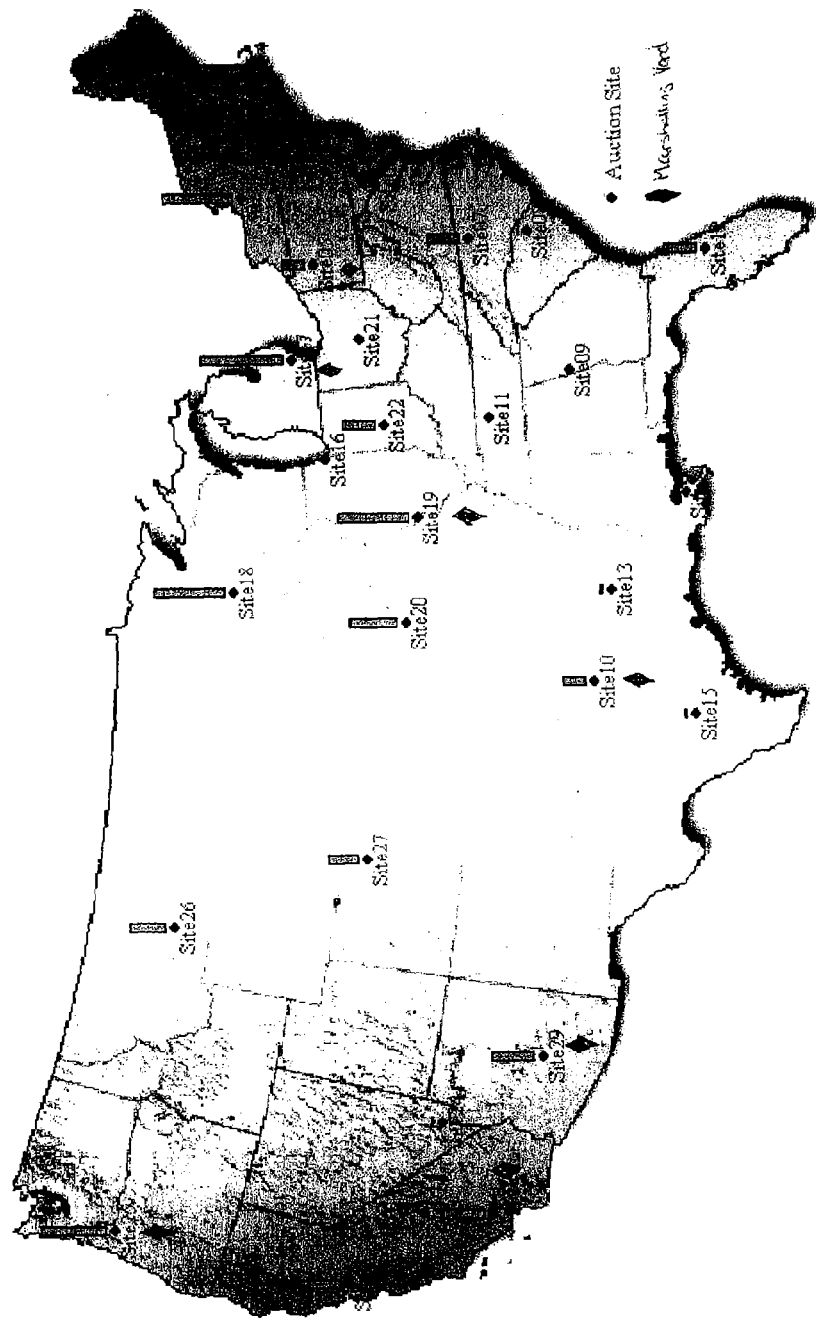
FIG. 1 illustrates an exemplary commodity product distribution market.

FIG. 1 illustrates a geographical representation of a commodity product distribution area. As used herein, commodity products include any article of manufacture exchanged in commerce. For purpose of explanation, only, the present invention will, at times, be described using a vehicle as the example commodity product. Vehicles are intended to serve as an example commodity product only and such example is not intended to limit the invention. In the vehicle remarketing industry, vehicles are initially received and inventoried at source locations called marshalling yards. The inventory process is used to gather commodity product description data. For example, with respect to vehicles, relevant commodity description data would include a usage measurement such as mileage driven as indicated on the vehicle's odometer. Additional commodity description data might include information describing one or more features, some of which are optional, such as make, model type, year of production, engine, transmission, body type, drive type, and color. Once inventoried, the vehicles are ready to be distributed to target sites. In the present example the target sites are identified as auction sites. The vehicles will be sold at auction to various retail dealers. The retail dealers will in turn market the vehicle for sale to the retail public. A distribution plan is used to instruct the source site as to how the vehicles are to be distributed among the target sites. At any given time, for one typical auto manufacturer, there may be anywhere between 300 and 3000 vehicles distributed per day for auction. These vehicles are distributed from approximately 30 marshalling yards to approximately 40 auction sites nationwide. A wide range of auction prices can be expected due to mixed models, model years, vehicle attributes such as color or optional features, economic conditions, and the auction site location itself. Additional factors that contribute to the net proceeds from auction sales include vehicle depreciation and interest rate costs as well as constraints on shipments and auction site capacities. The present invention provides a forecast of auction prices for the vehicles that take these various factors into consideration. In this way, an optimal distribution plan aimed at the maximization of the potential profit for the auction vehicles is generated.

Exemplary System Implementation

Figure 2:
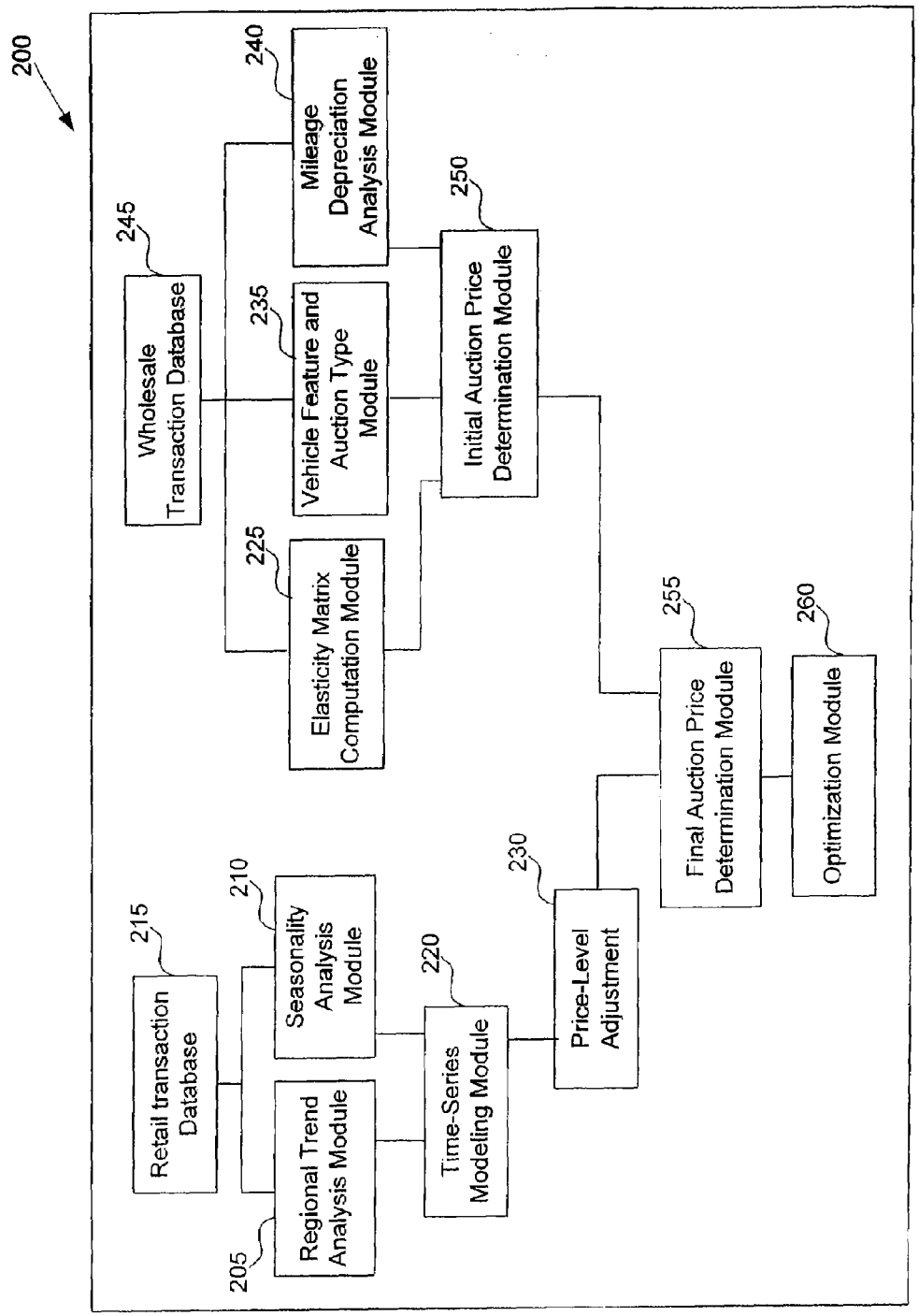
FIG. 2 illustrates an exemplary auction commodity distribution system according to an embodiment of the present invention.

FIG. 2 illustrates an exemplary embodiment of an optimized commodity product distribution plan generating system 200. Dealer performance in the retail sales market has significant impact on subsequent auction prices. More specifically, dealers have strong incentive to purchase more vehicles at auctions when they know the vehicles will provide a high profit margin and have a low number of days to turn (i.e. number of days from the time the vehicle is purchased at wholesale to the time when the vehicle is sold on the retail lot). Accordingly, in an embodiment of the present invention, a retail transaction database 215 is used to collect retail transaction data. An example retail transaction database is one that is available from Power Information Network (PIN). This database collects daily data from more than 5,000 dealers covering regions of all major auction sites.

The retail auto market is also impacted by the economic stability of the geographic areas in which the retail dealers are located. Thus, in an embodiment, the system 200 includes a regional trend analysis module 205. The regional trend analysis module 205 is responsible for providing a regional trend analysis based on retail market performance data and region data related to economic factors such as unemployment, gross product growth, and population growth.

Like many other commodity product markets, the automobile market exhibits strong responses to season changes. Therefore, a seasonality analysis module 210 is provided to quantify the seasonal effects on auction prices for particular vehicle models and model years. A time-series modeling module 220 is provided to generate analysis of commodity product data over a period of time. For example, time-series models can be constructed for different regional markets for vehicles with reasonably large volume.

In an embodiment, the system 200 is further provided with a price-level adjustment module 230. The price-level adjustment module can be configured to determine auction price adjustments based on changes in regional retail market conditions, seasonal changes in commodity product demand and supply, and changes in auction volumes of the same commodity product as well as its substitute products.

Another important factor in forecasting a commodity product auction price is the effect of auction volume on auction price. In economic terms, this relationship is expressed as price elasticity. Price elasticity includes self-price elasticity and cross-elasticity. Self-price elasticity is the percentage decrease in auction price due to one percentage increase in auction volume of the same commodity product. Cross-price elasticity measures the percentage decrease in auction price due to one percentage increase in auction volume of a substitute commodity product. Cross-price elasticity can be significant not only between commodity products having the same model type, but also between commodity products having the same model type but different model years. An elasticity matrix computation module 225 is therefore provided to perform price elasticity computations using data obtained from the wholesale transaction database 245. Wholesale transaction database 245 is used to collect information associated with past and future auction sales. One resource for obtaining such data is the National Automobile Dealers Association (NADA) Auction Net database. Further, to achieve maximum forecast accuracy with respect to vehicles, it is desirable to have Vehicle Identification Number-level sales codes for individual vehicles from the Original Equipment Manufacturers (OEMs).

The degree to which a commodity product has been put to use is another important factor in determining its forecasted auction price. Where the commodity product is a vehicle, an appropriate usage measurement is mileage. Using mileage data for previously auctioned vehicles obtained from the wholesale transaction database 245, a usage depreciation analysis module 240 is used to generate a mileage deduction curve for each model type/model year combination.

In addition to usage differences, individual commodity products of the same commodity model type may differ in other respects. For example, with vehicles, other differences might include vehicle optional features (engine, body type, transmission etc.), vehicle color, and interior materials. Further, two identical commodity products can be auctioned at different prices if they are auctioned at different locations, or even simply under a different auction type (closed auction versus open auction, auctioned in a regular auction versus auctioned in a special promotion event). Thus, a vehicle feature and auction type module 235 is used to analyze such differences in order to determine how each affects the commodity product's auction price.

An initial auction price determination module 250 is configured to determine an initial forecast auction price for a commodity product using the results provided by the elasticity matrix computation module 225, commodity product feature and auction type module 235, and usage depreciation analysis module 240.

A final auction price determination module 255 is provided to determine a final forecast auction price for the commodity products. This module takes the initial auction prices provided by the initial auction price determination module 250 and adjusts them according to the price-level adjustments determined by price-level adjustment module 230. In this way, the final forecasted auction price reflects not only historical auction prices, but also current regional retail market conditions, seasonal affects, and auction volume of the same and substitute commodity products.

Once the auction prices are forecasted for the commodity products at each individual auction site, an optimization module 260 is provided to further analyze proposed distribution plans in order to identify an optimized commodity product distribution plan. The intent of the optimized commodity product distribution plan is to distribute the commodity products among the target sites in a manner designed to yield the highest possible return on investment. In an embodiment of the present invention, the modules described herein are implemented as computer program products stored on a computer readable medium and executable by a computer processor. Based on the teaching provided herein, persons skilled in the relevant arts will recognize alternative ways for implementing such modules. Such alternative mechanisms are intended to be within the spirit and scope of the present invention.

Exemplary Method of Operation

An exemplary flow diagram for generating an optimized auction commodity distribution plan according to an embodiment of the present invention will now be described with reference to FIG. 3.

Figure 3:
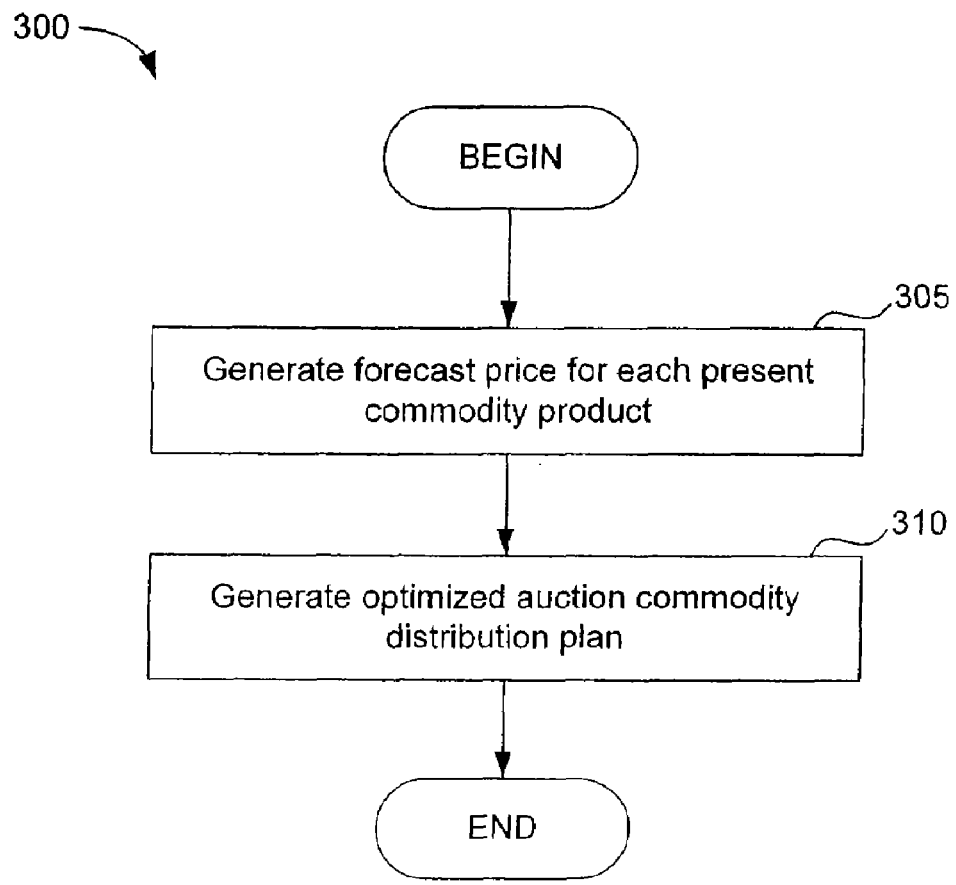
FIG. 3 illustrates an exemplary flow diagram for generating an optimized auction commodity distribution plan according to an embodiment of the present invention.

Referring to FIG. 3, in a first step, 305, a forecast price for each present commodity product is generated. A present commodity product is used to refer generally to those commodity products located at source sites that are intended to be distributed to target or auction sites to be sold. An exemplary method for generating the forecast auction prices for the present commodity products will be further described with reference to the steps of FIG. 4 and further reference to the modules shown in FIG. 2.

Figure 4:
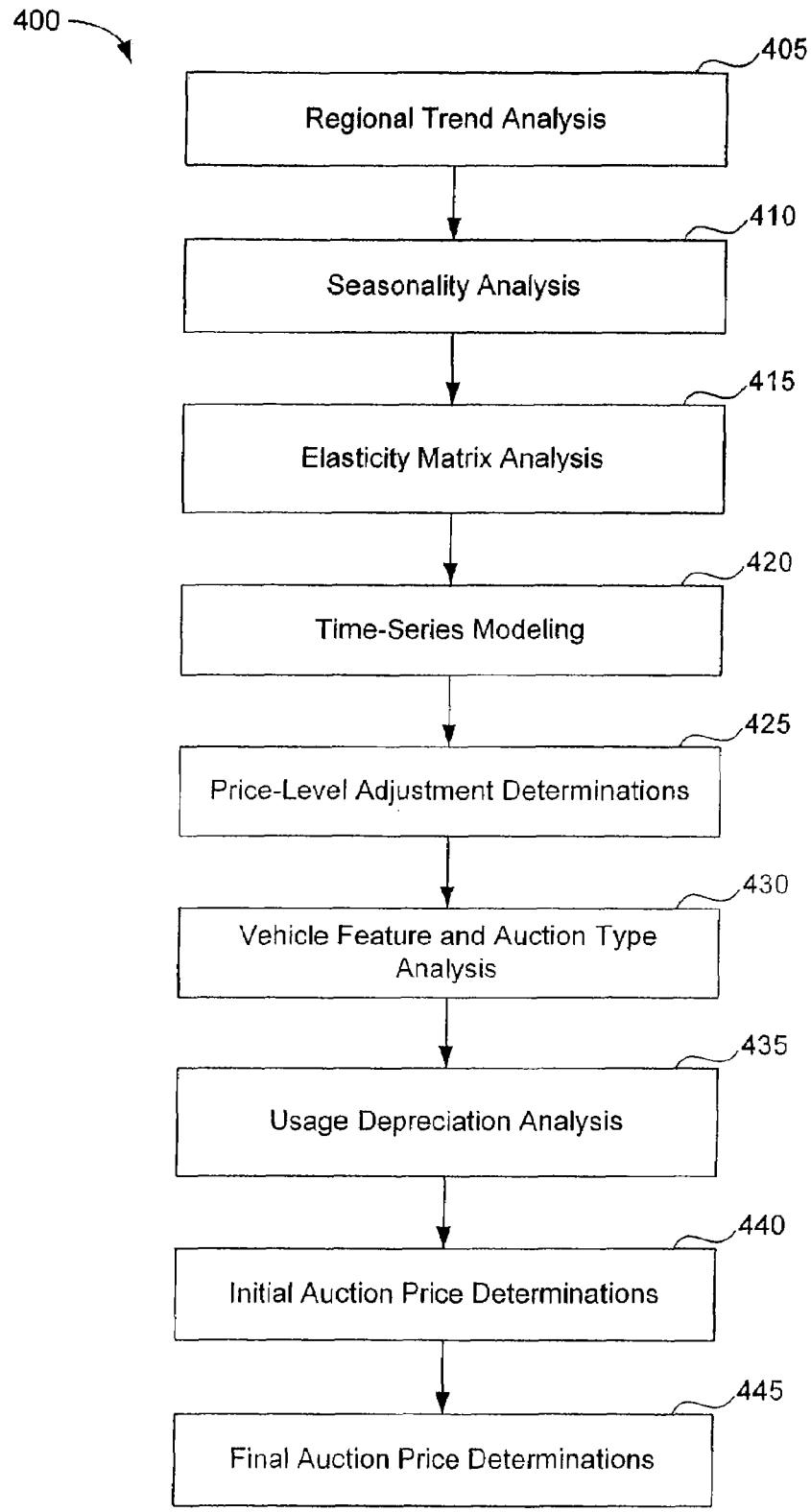
FIG. 4 illustrates an exemplary flow diagram for generating auction commodity product forecast prices according to an embodiment of the present invention.
Figure 5:
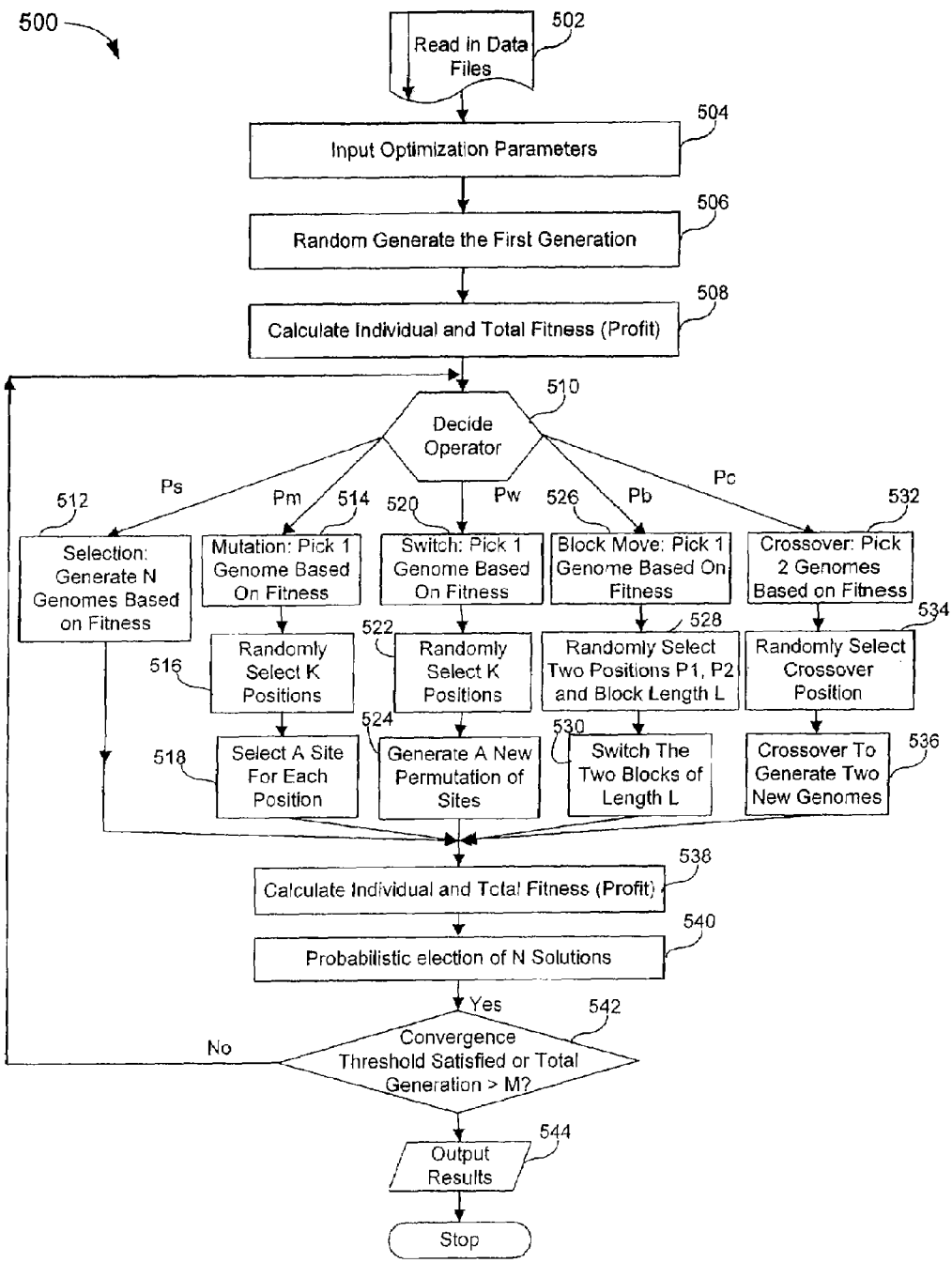
FIG. 5 illustrates an exemplary flow diagram providing further details for generating an optimized auction commodity distribution plan according to an embodiment of the present invention.

Referring to FIG. 4, in a step 405, regional trend analysis module 205 is used to perform a regional trend analysis. In an embodiment, the regional trend analysis estimates the profit margins of commodity products sold at retail. The analysis further estimates the time-to-turn or number of days it took for the commodity products to sell at the retail outlet. To perform such analysis, retail market performance data for one or more past retail commodity products sold at one or more retail sites is obtained.

The regional trend analysis step 405 is further intended to incorporate into the analysis, macroeconomic variables associated with the various regional markets where the commodity products are to be sold. Thus, regional data relevant to the one or more retail sites is also obtained. Examples of relevant regional data include local unemployment data, gross product growth data, and population growth data. In an embodiment, a vector auto-regression model is constructed to model the interaction between the retail commodity product market and the regional economic variables.

The true value of historical auction prices as an accurate predictive indicator of future auction prices is improved when the circumstances and factors affecting the auction prices are properly evaluated. To support such analysis, past auction commodity product description data is obtained for past auction commodity products. Examples of such data include, past commodity usage measurements, such as mileage; past optional features associated with the past auction commodity products; and the types of auctions where the past commodity auction products were sold.

In a step 410, seasonality analysis module 210 is used to execute a seasonality analysis. In an embodiment, clustering analysis is performed to classify seasonality behavior of vehicle product prices. The seasonality analysis is used to quantify the seasonal effects on past auction price levels for a particular type of past auction commodity products. For example, convertible vehicles are less popular in the wintertime for cold climate geographical regions. Thus, it can be expected that the demand for such vehicles by retail customers would be lower in those locations. Consequently, dealers are likely to pay less for convertible vehicles at such auction locations.

In a step 415, elasticity matrix computation module 225 is used to perform one or more elasticity computations for past auction commodity products sold at auction. In an embodiment, one such elasticity computation is determining a self-price-elasticity value. The self-price-elasticity value represents a percentage decrease in a past auction commodity price paid for a first one of the past auction commodity products due to a percentage increase in auction volume of a second past auction commodity product. In one case, the first and second past auction commodity products have the same commodity model type and the same commodity model year. Commodity model type describes a particular name used to identify the product type. For example, a 2002 Jeep Grand Cherokee would have a commodity model type of "Grand Cherokee" and a commodity model year of "2002". Other designations for representing and distinguishing between different commodity product types and year of manufacture can be implemented without departing from the spirit and scope of the present invention.

In another embodiment, a cross-price elasticity value is determined. Cross-price elasticity values represent a percentage decrease in past auction commodity prices paid for a first one of the past auction commodity products due to a percentage increase in auction volume of a second one of the past auction commodity products. In one case, the first and second past auction commodity products have different commodity model types. Cross-price elasticity computations may also be determined where the first and second past auction commodity products have a different commodity model year.

In a step 420, time-series modeling module 220 is used to generate time-series models. In an embodiment, a time-series model is generated for each past retail commodity product using the results of the regional trend analysis and the seasonality analysis. In this way, the effect of seasonal changes on commodity product auction prices over time in a particular region can be modeled independently.

In a step 425, the price-level adjustment module 230 is used to determine a number of price-level adjustments using the elasticity matrix analysis results and the time series models. In this way, the price-level adjustments reflect the trend in past commodity auction prices given changes in regional retail market conditions, commodity product demand and supply, changes in auction volumes for the same commodity products as well as substitute commodity products.

In a step 430, the vehicle feature and auction type module 234 performs a commodity optional feature analysis. In an embodiment, the commodity optional feature analysis entails defining one or more past commodity product feature groups. These groups are representative of those past auction commodity products that have the same past optional features. A past commodity product feature model is then generated for each of the past commodity product feature groups. As will be described further below, the past commodity product feature models for each respective group are then used to determine an initial auction price.

In an embodiment, an auction type analysis is also performed by the vehicle feature and auction type module 234. The auction type analysis is used to quantify the differences in auction prices attributable to the location or auction type. For example, two identical vehicles can be auctioned at different prices if they are auctioned at different locations or under a closed versus open auction type. To perform the auction type analysis, one or more past auction type groups are defined. In an embodiment, the past auction type groups are representative of one or more past auction commodity products that are associated with the same past auction type. Once the past auction type groups have been established, a past auction type model for each group is generated. These models are then used for determining an initial auction price for each commodity product.

The amount of use that a commodity product has been subjected to greatly impacts its retail price. Any reliable forecast auction price should therefore take usage into account. Thus, a usage depreciation analysis is performed in step 435 using the usage depreciation analysis module 240. In an embodiment, the usage depreciation analysis includes defining one or more past commodity product groups. The past commodity product groups are defined such that each group is representative of those past auction commodity products that have the same commodity model type and the same commodity model year. Once the groups have been defined, a usage measurement deduction curve is generated for each of the groups. In an embodiment, the usage measurement curves are generated using multi-variate regression analysis on past auction commodity usage measurements associated with the past commodity product groups.

As part of the process for generating forecast prices for each commodity product, an initial auction price is determined in a step 440. In an embodiment, this step is performed by the initial auction price determination module 250. The initial forecast auction commodity price for each present auction commodity product is determined using the past auction commodity description data and auction commodity description data describing the present commodity products. Accordingly, in an embodiment, present auction commodity description data is obtained for one or more present auction commodity products. Examples of such data include present commodity usage measurements, optional features associated with each commodity product, and a particular auction type at which the commodity product is to be sold.

In determining an initial forecast auction commodity price, a usage measurement deduction for each of the present auction commodity products is determined using the usage measurement deduction curves generated in step 435. More particularly, the usage measurement deduction curve corresponding to the past commodity product group having the same commodity model type and the same commodity model year as the present auction commodity product is used to determined the usage measurement deduction.

Determination of initial forecast commodity product auction prices further includes determining a confidence distance between the present auction commodity products and the past auction commodity products. A confidence distance quantifies the similarities between the past and present commodity products being compared. For example, the confidence distances might be different for a present auction commodity product having the same commodity model and same commodity year as two past auction commodity products depending on the amount of optional features each has in common with the present commodity product. Once confidence distances are determined, a confidence weight is assigned to the past auction commodity products based on the determined confidence distances. A nearest neighborhood approach, utilizing the usage measurement analysis and commodity product optional feature and auction type analysis, compares the accumulated historical auction data to the present auction commodity product. The initial auction forecast price for a particular present auction commodity product is then set equal to the weighted average of the past auction prices paid for the past auction commodity products based on the assigned confidence weights. In this way, the past auction prices associated with the past commodity products most similar to the present auction commodity product will contribute more to the forecast auction price.

Once an initial auction price has been determined for each present auction commodity product, a final auction price is determined in step 445. In an embodiment, the final auction price determination module 255 obtains present retail market condition data, present commodity product demand data based on seasonal changes, present commodity product supply data, and present auction volume data.

The final auction price for each present auction commodity product is then generated by adjusting the initial auction forecast prices using the price level adjustments determined in step 425 and the present retail market condition data, present commodity product demand data based on seasonal changes, present commodity product supply data, and present auction volume data. In this way, price-level adjustments can be made to the forecast auction prices to account for present economic and supply variables that are similar to those observed in the past.

Returning to FIG. 3, once a forecast price has been generated for each present commodity product, in a step 310, an optimized auction commodity product distribution plan is generated. The present invention adopts a genetic algorithm based optimal solution search technique to generate an optimized auction commodity product distribution plan. The genetic algorithm is a well-known method for solving optimization problems that do not lend themselves to solution via classical optimization methods and for which heuristic solutions are unavailable. More specifically, the genetic algorithm is based on natural evolutionary principles and uses genetic operators to simulate the process of natural selection. Through this selection process an optimized solution to the problem being addressed is evolved.

In order to find the optimal commodity product distribution plan using the genetic algorithm based search approach, several key requirements must be satisfied. The first requirement is appropriate representation of the problem. In an embodiment of the present invention, a distribution plan, or a solution, is represented as a genome. A genome is an array of commodity product objects. In an embodiment, a commodity product object is comprised of the present commodity description data for one of the present auction commodity products, a source location, and a target location.

A second requirement to be met for implementing the genetic algorithm is the identification of constraints on the optimized solution. Constraints are identified as either hard or soft. Hard constraints are those rules which cannot be broken by the distribution plan. Soft constraints on the other hand, can be violated at certain costs. In the present invention, examples of hard constraints include prohibitions on shipping commodity products from a source site to certain target sites and limitations on the number of commodity products of a particular commodity model type or year that can be at a target site at a given point in time. Soft constraints include a desire to ship commodity products in certain multiples or perhaps a preference to ship a certain percentage of commodity products from a source site to a preferred target site.

An additional constraint considered in the genetic algorithm used in the present invention is a risk constraint. The risk constraint is a user defined parameter that quantifies the risk the commodity product owner is willing to take for shipping the commodity product to a particular site in the hope of getting a higher auction price. In an embodiment of the present invention, the following equation is used to determine if the expected gain exceeds the defined risk threshold:

$$f(E(P_{A_i^s}), \sigma(P_{A_i^s}), S_i^s) > \delta \qquad (1)$$

where $E(P_{A_i^s})$ represents the expected price of vehicle i at auction site A for a solution s $\sigma(P_{A_i^s})$ represents the standard error of $P_{A_i^s}$ $S_i^s$ represents the shipping cost of vehicle i for a solution s $\delta$ represents the risk threshold The next requirement to be satisfied is the identification of genetic operators used to evolve new genomes from a prior generation. Examples of genetic operators include crossover, block move, switch, mutation, and selection. Further details of these genetic operators are provided further below.

Another key requirement for implementing evolutionary computation methods is the establishment of a fitness function for evaluating the quality of the different solutions. In this case, a fitness function is used to evaluate the quality of the commodity product distribution plans (i.e., genomes). The following fitness function is used in an embodiment of the present invention: Fitness of solution s for time t $$\text{Fitness}(s, t) = \sum_{i=1}^{N} f(P_i^s, S_i^s, T_i^s, E_i^s) \quad (2)$$

where
- i represents the $i^{th}$ vehicle
- N represents the total number of vehicles
- $P_i^s$ represents the forecasted price for vehicle i at time t for solution s as determined by the following equation:

$$P_i^s = f_1(\bar{v}_i, t, A_i^s) \quad (3)$$

- $\bar{v}_i$ represents vehicle attribute vector (model, model year, drive type, etc.)
- t represents time
- $A_i^s$ represents the $i^{th}$ vehicle at auction site A for solution s
- $S_i^s$ represents the shipping cost for vehicle i for solution s as determined by the following equation:

$$S_i^s = f_2(M_i, A_i^s) \quad (4)$$

where:
- $M_i$ represents the marshalling yard for vehicle i
- $A_i^s$ represents the auction site of vehicle i for solution s
- $T_i^s$ represents the asset carrying cost for vehicle i at time t for solution s $$T_i^s = f_3(\gamma_t, \text{Dep}_{VT_i}^{t,t'}) \quad (5)$$

- $\gamma_t$ represents the interest rate at time t
- $\text{Dep}_{VT_i}^{t,t'}$ represents the depreciation from t to t' for vehicle type VT that vehicle i belongs to $$t' = f_4(t, t_{ship \, A_i^s}, \bar{t}_{processing}, \text{Auction Schedule at } A_i^s) \quad (6)$$

- t represents the current time
- $t_{ship \, Adi \, i}^s$ represents the shipping time for vehicle i shipped to auction site A
- $\bar{t}_{processing}$ represents the average time needed to process a vehicle before auction (title transfer time, conditioning time, etc.)
- Auction Schedule at $A_i^s$ represents the auction schedule at $A_i^s$
- $E_i^s$ represents the elasticity for vehicle i of state s as determined by the following equation:

$$E_i^s = f_5(\text{Inventory}_{A_i^s, VT_i}, \text{InTransitVol}_{A_i^s, VT_i}, \text{Curr.Ship.Vol}_{A_i^s, VT_i}, \text{coef}_{A_i^s, VT_i}) \quad (7)$$

where:
- $\text{Inventory}_{A_i^s, VT_i}$ represents the inventory of vehicle type VT of vehicle i at auction site A where vehicle i is shipped to for a solution s $\text{InTransitVol}_{A_i^s, VT_i}$ represents the volume of in transit vehicle type VT of vehicle i to auction site A where vehicle i is shipped to for a solution
- $\text{Curr.Ship.Vol}_{A_i^s, VT_i}$ represents the current shipment volume of vehicle type VT of vehicle i to auction site A where vehicle i is shipped to for a solution s
- $\text{Coef}_{A_i^s, VT_i}$ represents the elasticity coefficient of vehicle type $VT_i$ of vehicle i at auction site A where vehicle i is shipped to for a solution S.

Once the key requirements have been established, the steps of generating an optimized commodity product distribution plan are ready to be executed. Thus, in a first step 502, optimization data is obtained. In an embodiment, the optimization data includes the forecast prices generated in step 305. The optimization data further includes the present auction commodity product description data, shipping cost data, shipping time data, a time-value adjustment, a current inventory listing for each of the auction sites, a capacity constraint for each of the auction sites, and a local elasticity measurement for each of the auction sites. The shipping cost data represents the expense of moving a commodity product from the source site to the target site. The shipping time data represents the period of time, generally measured in days, required to transport the commodity product from the source site to the target site. The time-value adjustment is a calculation used to represent the costs to the commodity product's owner for carrying the commodity product on his books. Such costs are usually measured by the amount of interest the commodity product owner must pay the bank for the period of time between distribution and sale at auction of the commodity product. The capacity constraint describes any limits a particular auction site or target site has with respect to the number or type of commodity products it can receive. The local elasticity measurement quantifies the affect that the presence of the same or substitute commodity products have on auction prices at the given auction site.

In a step 504, optimization parameters are input. In an embodiment, optimization parameters include a population size, genetic operator usage parameters, convergence criteria, and a maximum iteration number. The population size can be a user defined parameter and is used to indicate the number of genomes or distribution plans in the population. The genetic algorithm determines what operators are to be used and how they are used. While convergence criteria determine when a solution is regarded as stable enough so that the process can be terminated. The maximum iteration number is used to limit the amount of iterations the algorithm will go through before terminating.

In a step 506, a first generation of genomes are generated. In an embodiment, the number of genomes in this first generation will be equal to the population size selected in step 504.

In a step 508, the first generation of genomes are evaluated to determine a first fitness value for each commodity product object in the respective genomes. In an embodiment, the first fitness value for each commodity product object is determined in accordance with Equation 2 as described above. A second fitness value is determined by adding the first fitness values for each commodity product object in a specific genome with one another. In this way, a genome fitness value is determined. Once the genome fitness values have been determined, the first generation of genomes are evolved in order to produce genomes whose distribution plan is likely to yield higher auction price returns.

Accordingly, in step 510, a genetic operator is selected to modify one or more genomes from the first generation of genomes.

Figure 6:
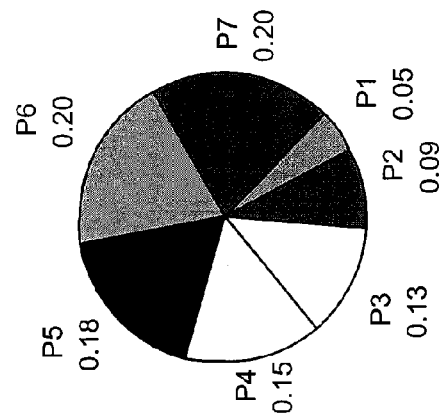
Figure 7:
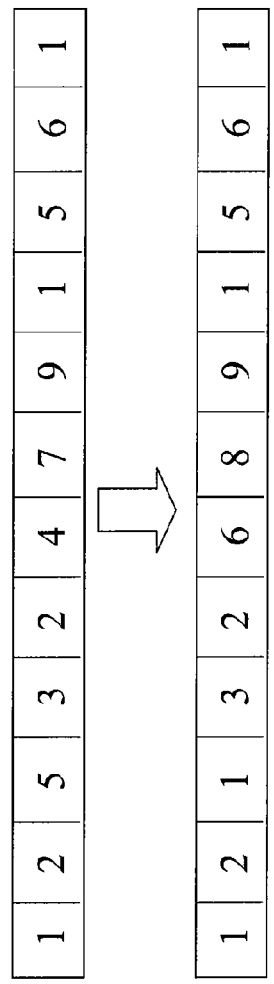
Figure 8:
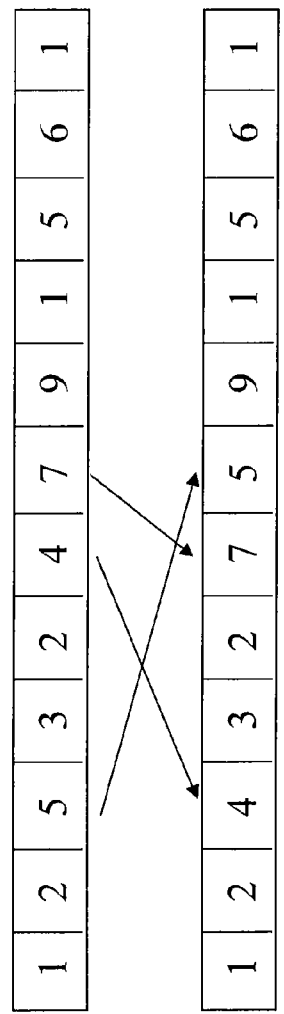
Figure 10:
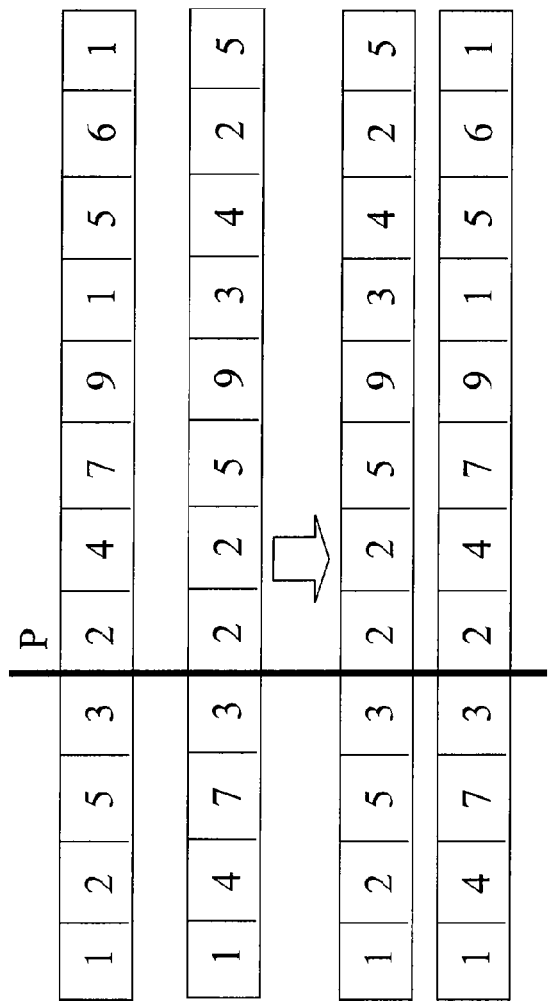

Referring to FIG. 6, where the selected genetic operator is the "Selection" operator, in step 512 a new generation of genomes are generated based on the determined second fitness values of the parent generation. In this first iteration, the parent generation is the first generation. In subsequent iterations, the parent generation will be the generation from the previous iteration. In accordance with the selection type genetic operator, genomes are selected using a probability distribution based on the second fitness values. In this way, the probability for any one genome to be selected is proportional to its relative fitness value. The selected genomes are then evolved, thereby producing one or more genomes. This approach increases the possibility that good genetic features will be passed to the next generation.

Where the "Mutation" genetic operator is selected, the generation is evolved in accordance with step 514. Referring to FIG. 7, mutation genetic operation includes the steps of selecting one or more commodity product objects from a genome (step 516) and in a step 518, randomly assigning new target sites to the selected commodity product objects. As a result of this genetic mutation, one or more modified genomes are produced.

Another possible genetic operator choice is "Switch". Thus, in a step 520, a selected genome from the first generation of genomes is evolved by first selecting two or more commodity product objects from the selected genome (step 522). Next, in a step 524, a modified genome is produced by randomly generating a new permutation of the selected commodity product object's target site.

Referring to step 526 and FIG. 9, a "Block move" genetic operator is selected. Block move entails selecting one genome based on its fitness function. Then, in a step 528, two positions (p1) and (p2) and a block length of (N) blocks are selected. Next, in a step 530, the two blocks of length (N) between positions (p1) and (p2) are switched. As a result a new modified genome is generated.

In a step 532, a "Crossover" genetic operator is selected. To generate two modified genomes, two genomes from the first generation are selected based on their fitness values. Next, in a step 534, a position within one of the genomes is selected as the crossover position. Then, in a step 536, two new modified genomes are generating by crossing over the selected portion of the genomes.

In step 538, once one or more modified genomes have been generated in accordance with either steps 512, 514, 520, 526, or 532, a third fitness value for each of the modified genomes is determined. In an embodiment, the third fitness value is determined in accordance with Equation 2.

In step 540, N (population size) genomes are selected based on probability values associated with fitness values. An evolved generation of genomes is then generated for a next iteration. In an embodiment, the evolved generation of genomes includes the selected modified genomes.

In a step 542, a determination is made as to whether a stop condition has been satisfied. In an embodiment, the stop condition is satisfied when a convergence threshold is met. The convergence threshold is set equal to the point where the changes in fitness evaluation of the modified generations fail to exceed a predetermined threshold over a specified number of iterations. In another embodiment, the stop condition is satisfied when the number of iterations exceeds the maximum iteration number provided in step 504. Once the stop condition has been satisfied, the evolved generation of genomes is selected as the optimized auction commodity distribution plan.

Finally, in a step 544, the optimized auction commodity distribution plan is outputted.

Exemplary Implementation

In order to provide a visual comparison of the results obtained using conventional means verses those realized from implementation of the present invention, a sample distribution plan is provided. In this example, there are 27 marshalling yards and 29 auction sites. The distribution plan is for a total of 1,260 vehicles representing 70 models and one model year.

Figure 11:
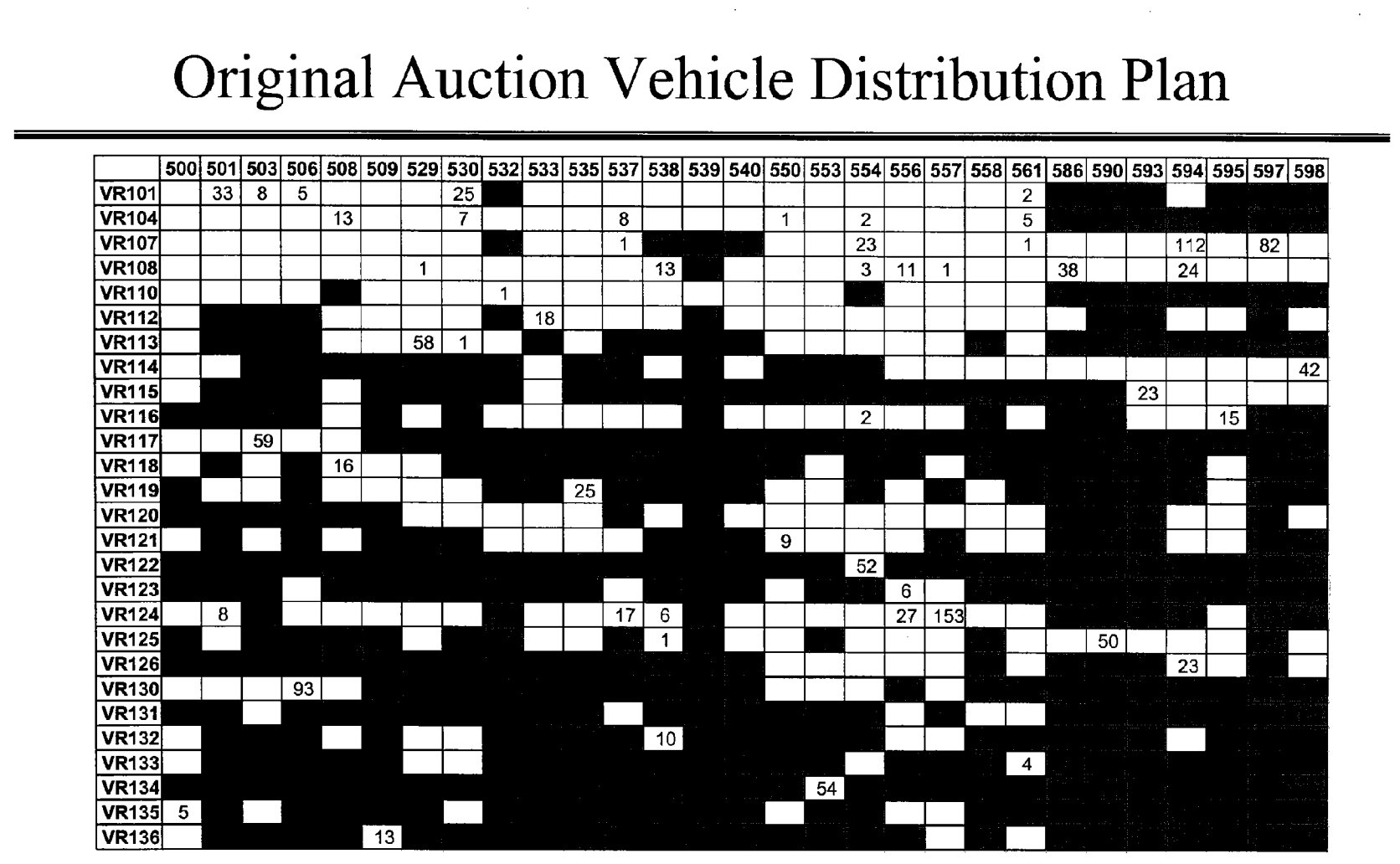
Figure 12:
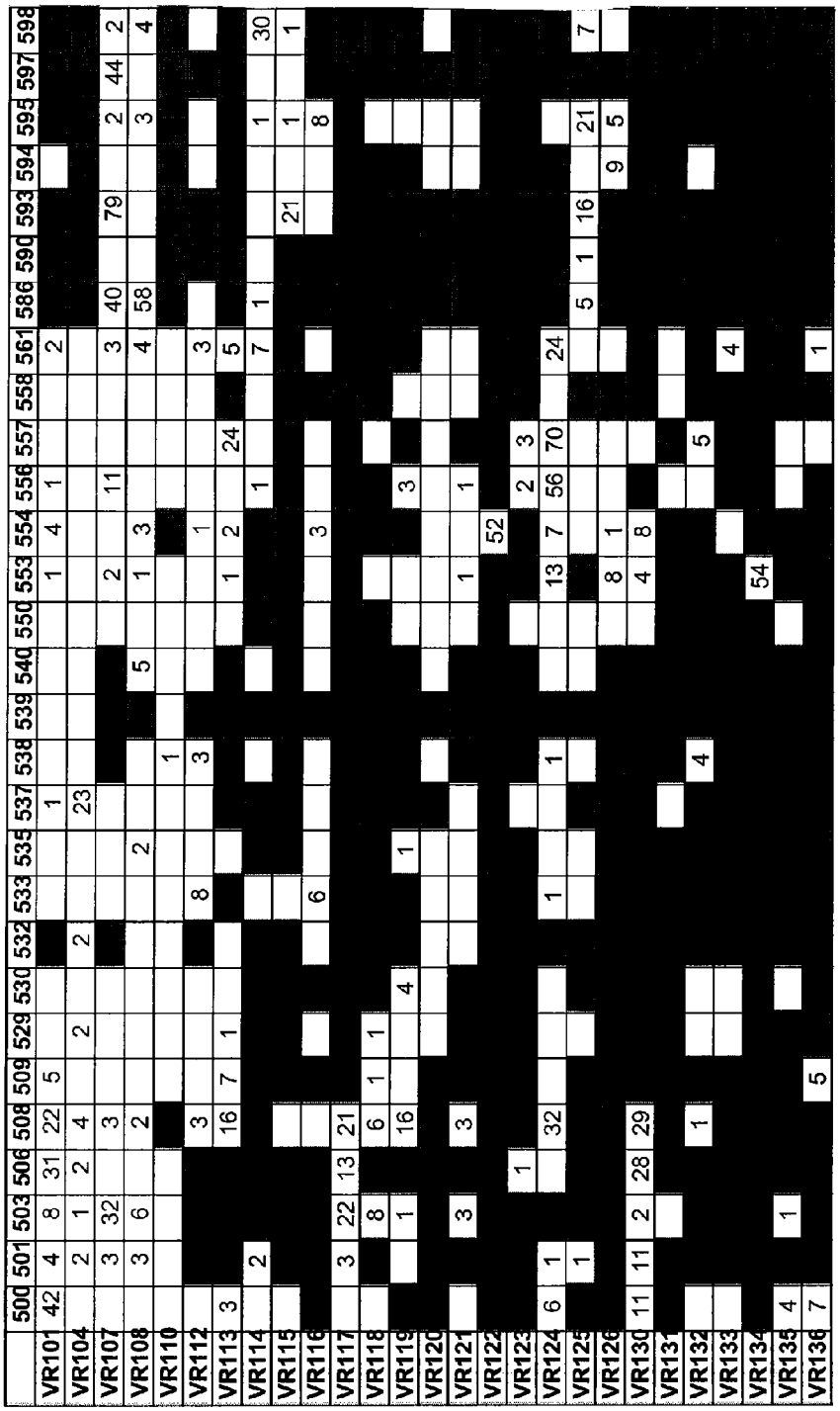
FIG. 12 illustrates an optimized auction vehicle distribution plan generated according to an embodiment of the present invention.

FIG. 11 illustrates an exemplary auction vehicle distribution plan developed for the vehicles using conventional methods. FIG. 12 illustrates an optimized auction vehicle distribution plan for the same set of vehicles generated in accordance with an embodiment of the present invention. By comparing the two distribution plans, it can be observed that initially, auction sites 500, 508, 509, and 537 were not selected to receive vehicles from marshalling site VR101. However, in the optimized auction vehicle distribution plan, each of these sites was designated to receive some number of vehicles.

FIG. 13 provides a side-by-side comparison of the economic costs and gains realized from implementing the optimized distribution plan as opposed to the original distribution plan. Of greatest significance is the potential increase in profits of (307,500) which can be realized by distributing the vehicles according to the optimized distribution plan.

In an embodiment of the present invention, a graphical user interface is provided for the user to generate and display reports using data associated with the optimized commodity product distribution plan.

Figure 14:
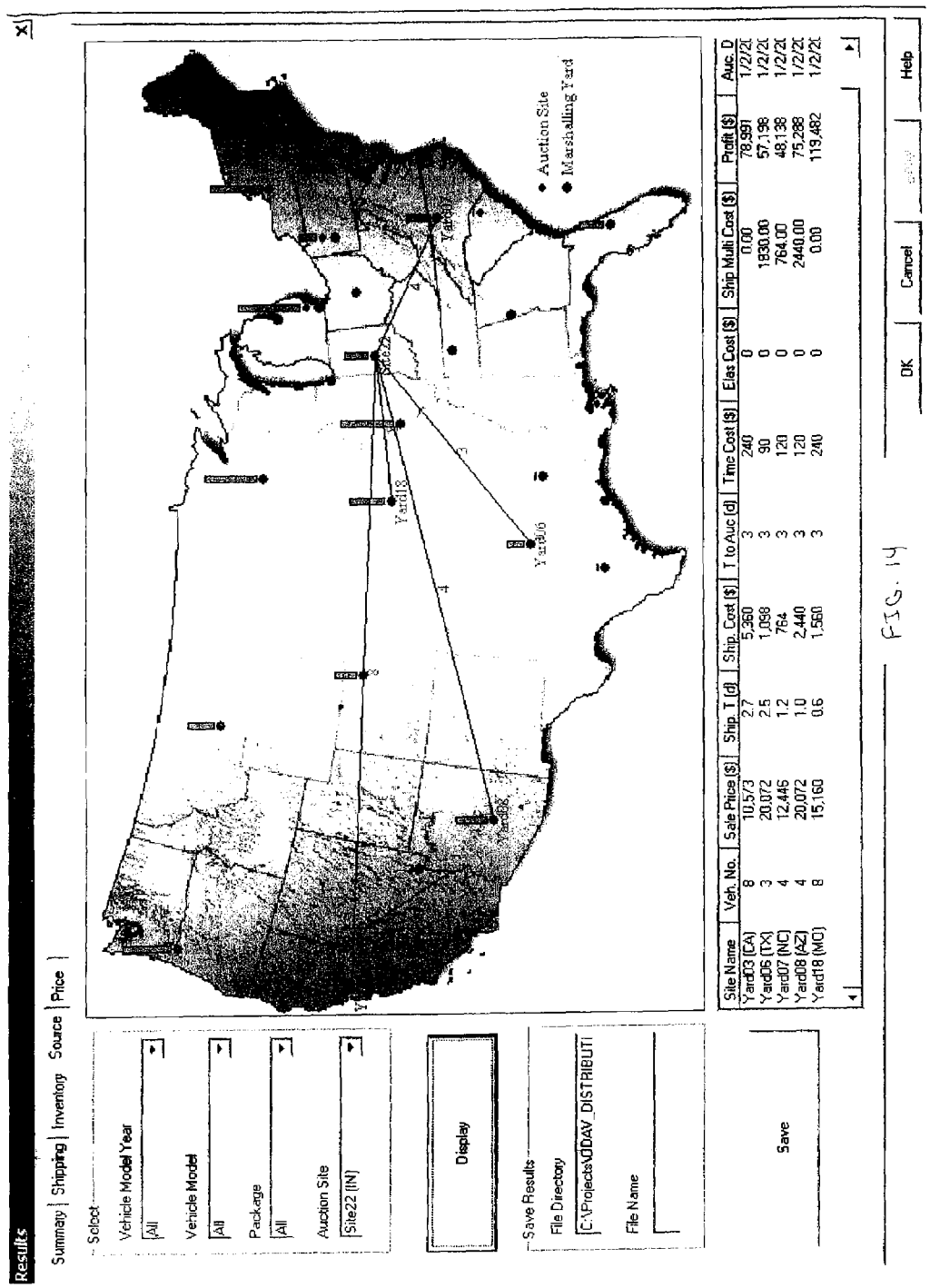
FIGS. 14-16 illustrate exemplary reports generated from an optimized auction vehicle distribution plan in accordance with an embodiment of the present invention.

For example, in FIG. 14, a report showing the number of commodity products to be distributed to from the respective marshalling yards to a particular auction site is presented. In this way, the viewer can quickly identify the marshalling sites that are supplying a particular auction site.

Figure 15:
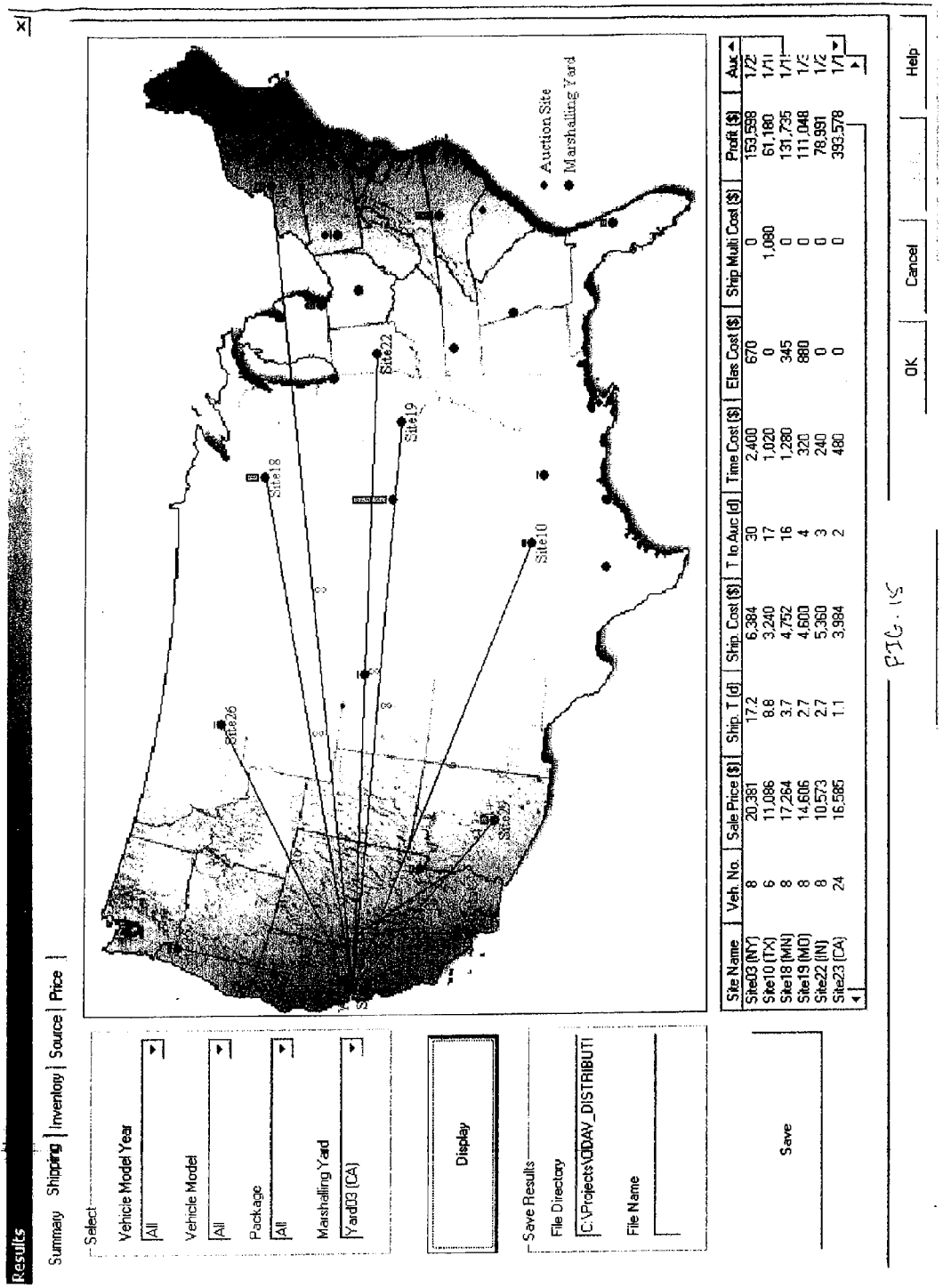

Referring to FIG. 15, a report showing the sites to which commodity products from a particular marshalling site are being sent is presented. In this way, the viewer can quickly identify the sites that a particular marshalling yard is supplying.

Figure 16:
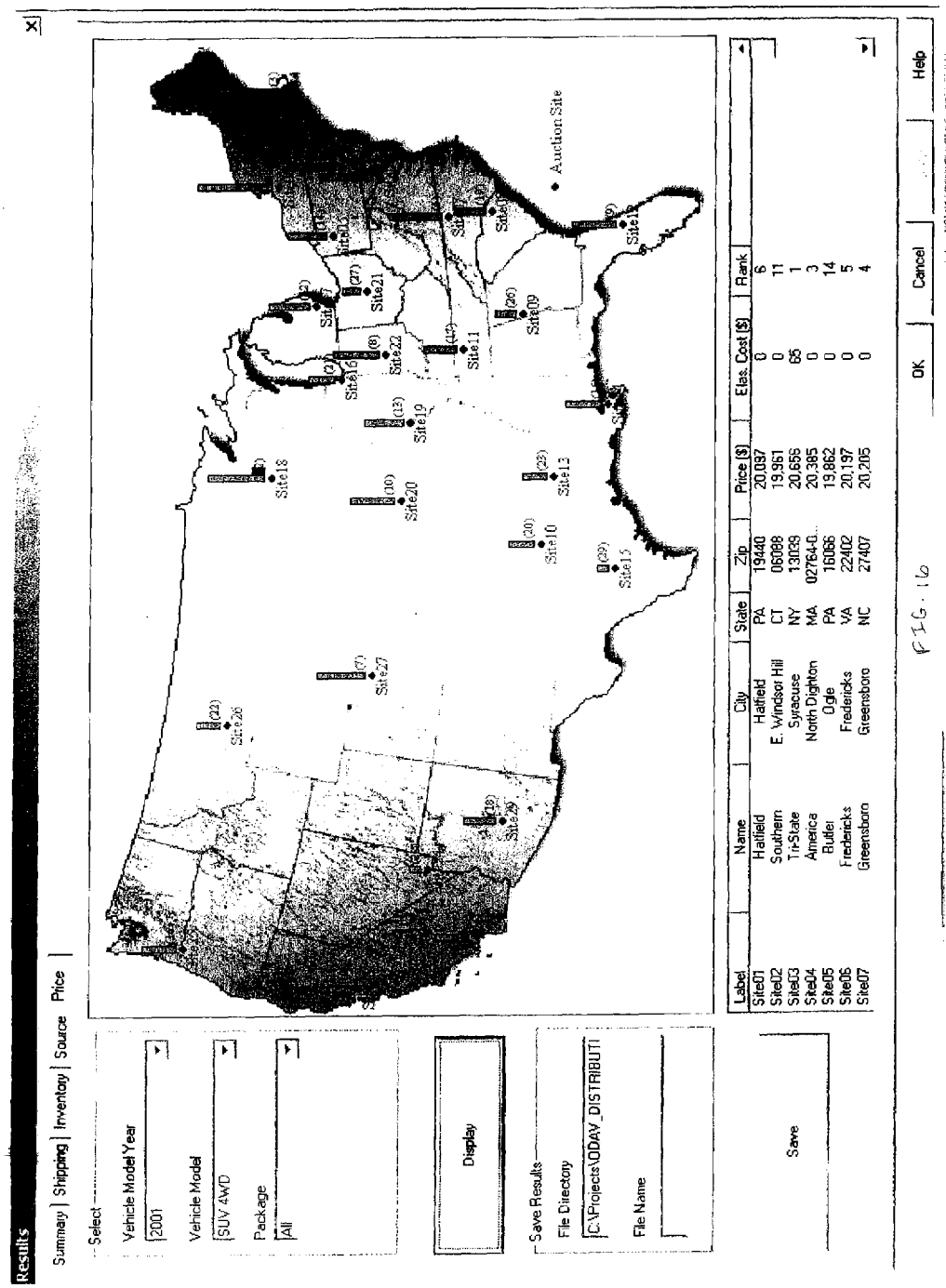

FIG. 16 shows a report showing the inventory at the respective auction sites for a particular commodity product model type. In this way, the viewer can quickly ascertain inventory levels and make certain decisions based on elasticity considerations.

Exemplary Computer System Embodiments

Figure 17:
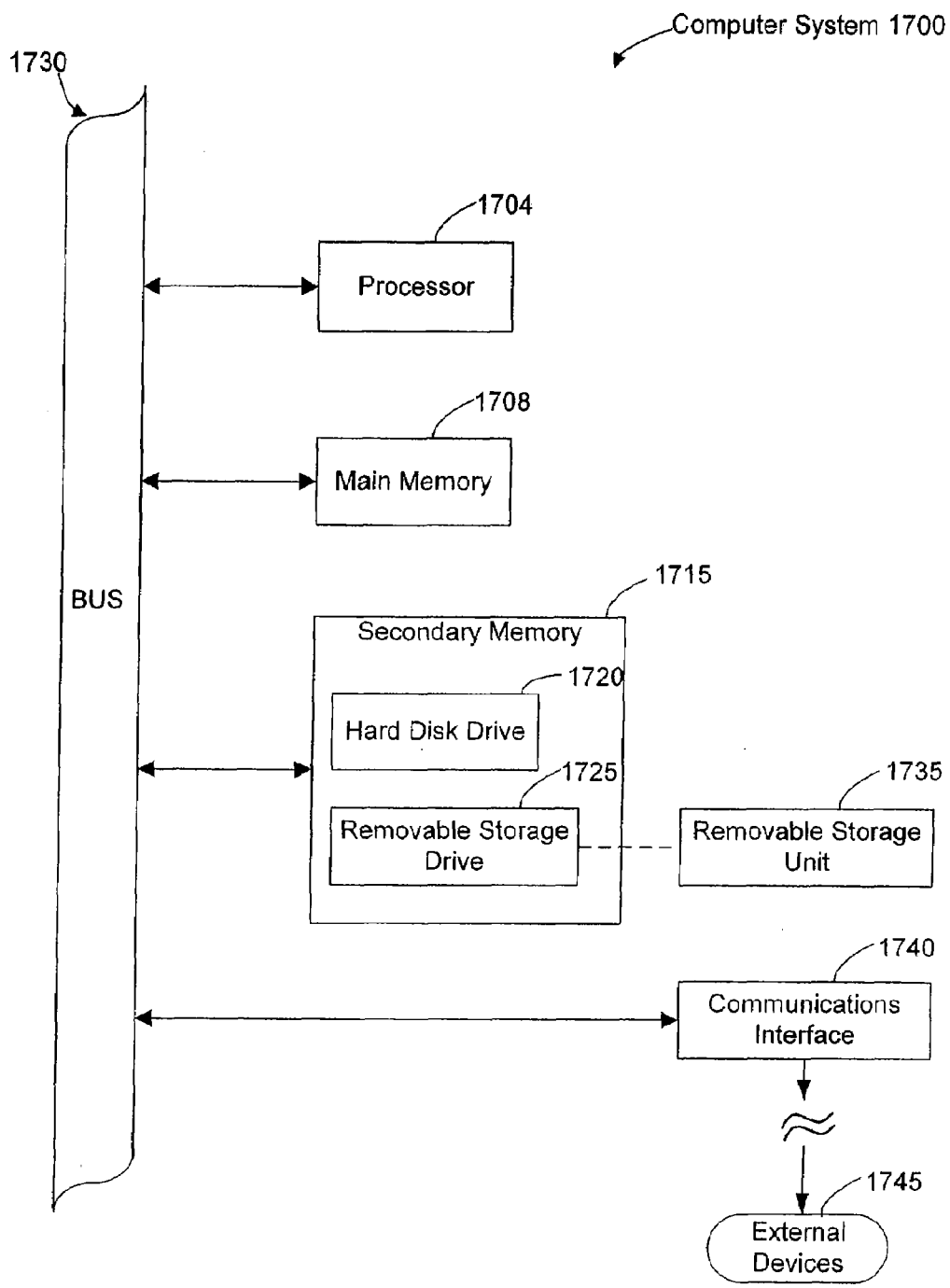
FIG. 17 illustrates an exemplary computer system for implementing an auction commodity distribution system according to an embodiment of the present invention.

In an embodiment, the system 200 is implemented using a computer system 1700 such as that shown in FIG. 17. The computer system 1700 includes one or more processors 1704. Processor 1704 is connected to a communication bus 1730. The computer system 1700 also includes a main memory 1708. Main memory 1708 is preferably random access memory (RAM). Computer system 1700 further includes secondary memory 1715. Secondary memory 1715 includes, for example, hard disk drive 1720 and/or removable storage drive 1725. Removable storage drive 1725 could be, for example, a floppy disk drive, a magnetic tape drive, a compact disk drive, a program cartridge and cartridge interface, or a removable memory chip. Removable storage drive 1725 reads from and writes to a removable storage unit 1735. Removable storage unit 1735, also called a program storage device or computer program product, represents a floppy disk, magnetic tape, compact disk, or other data storage device.

Computer programs or computer control logic are stored in main memory 1708 and/or secondary memory 1715. When executed, these computer programs enable computer system 1700 to perform the functions of the present invention as discussed herein. In particular, the computer programs enable the processor 1704 to perform the functions of the present invention. Accordingly, such computer programs represent controllers of the computer system 1700. In an embodiment, system 200 represents a computer program executing in the computer system 1700. In embodiments, the system 200 is centralized in a single computer system 1700. In other embodiments, the system 200 is distributed among multiple computer systems 1700. For example, all of the modules except for retail transaction database 215 and wholesale transaction database 245 could exist in a first set of computers 1700. The retail transaction database 215 and wholesale transaction database 245 could exist in a second set of computers 1700, and the GUI for displaying the generated optimization report could exist in a third set of computers 1700, where each of these sets could include one or more computers 1700, and the computers 1700 communicate over a network (such as a local area network, a wide area network, point-to-point links, the Internet, etc., or combinations thereof). The degree of centralization or distribution is implementation and/or application dependent.

Figure 18:
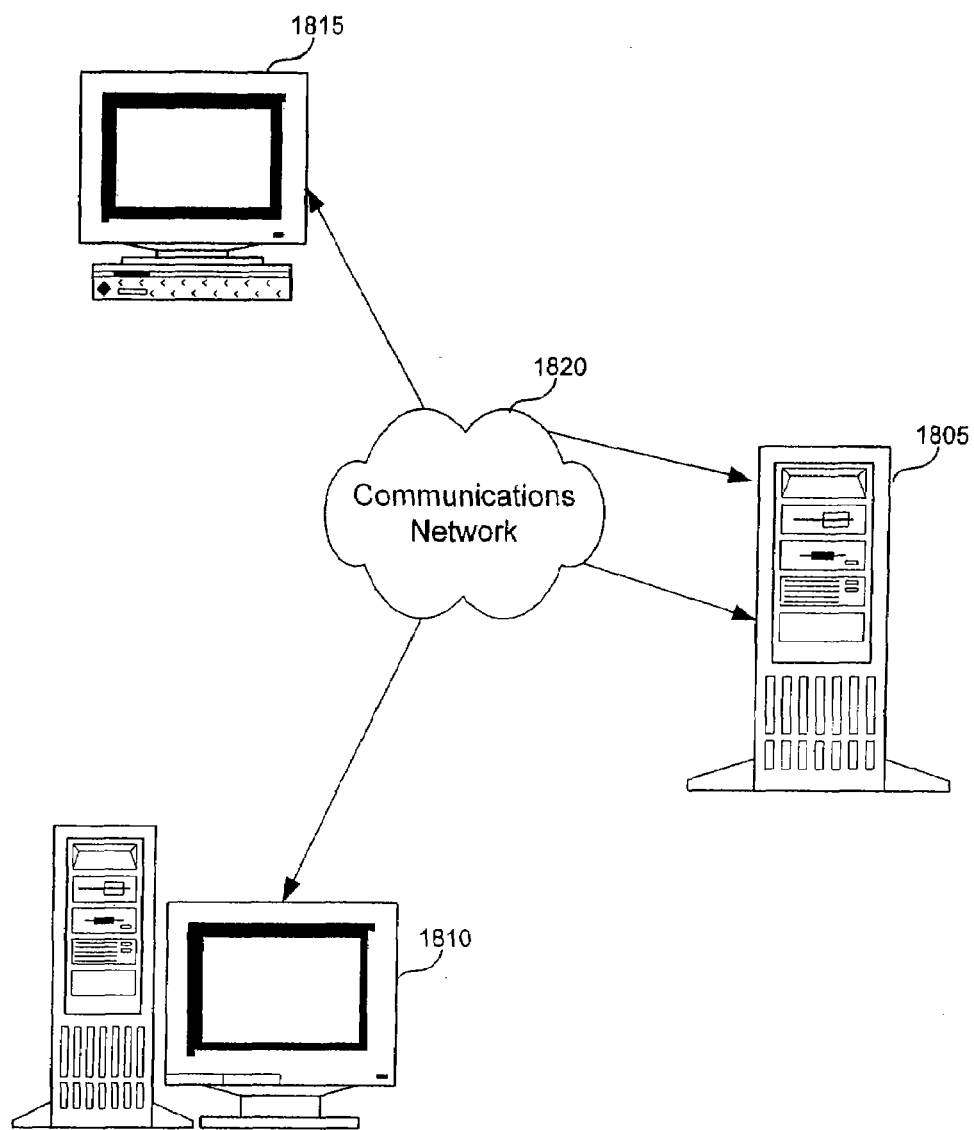
FIG. 18 illustrates an exemplary client-server system for implementing an auction commodity distribution system according to an embodiment of the present invention.

For example, consider FIG. 18, which illustrates example embodiments of the present invention. In one embodiment, the system 200 could reside in host computer 1805. A user would access the system 200 over communications network 1820 using an external device 1745 (FIG. 17) depicted in the example as input/output terminal 1815. In another embodiment, the GUI could reside in a personal computer 1810. Using communications network 1820, personal computer 1810 would then receive generated output results from the host computer 1805. The invention is not limited to these example embodiments. Other implementations of the tissue array analysis system 100 will be apparent to persons skilled in the relevant arts based at least in part on the teachings contained herein.

Referring again to FIG. 17, computer system 1700 further includes a communications interface 1740. Communications interface 1740 facilitates communications between computer system 1700 and local or remote external devices 1745. External devices 1745 could be, for example, personal computers, displays, databases, and additional computer systems 1700. In particular, communications interface 1745 enables computer system 1700 to send and receive software and data to/from external devices 1745. Examples of communications interface 1745 include a modem, a network interface, and a communications port. In one embodiment, the invention is directed to a computer system 1700 as shown in FIG. 17 and having the functionality described herein. In another embodiment, the invention is directed to a computer program product having stored therein computer software for controlling computer system 1700 in accordance with the functionality described herein. In another embodiment, the invention is directed to a system and method for transmitting and/or receiving computer software having the functionality described herein to/from external devices 1745.

CONCLUSION

Various embodiments of the present invention have been described above. It should be understood that these embodiments have been presented by way of example only, and not limitation. It will be understood by those skilled in the relevant arts that various changes in form and details of the embodiments described above can be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A computer-implemented method for generating an optimized auction commodity distribution plan for a predetermined number of present auction commodity products, the method comprising the steps of:

performing one or more elasticity computations for one or more past auction commodity products sold at one or more physical auction sites;

generating, with a processor, an auction forecast price for each of said predetermined number of present auction commodity products to be auctioned at said one or more physical auction sites using said one or more elasticity computations, wherein each of said present auction commodity products and said past commodity products have an associated commodity model type and a commodity model year; and generating, with said processor, an optimized auction commodity distribution plan for said predetermined number of present auction commodity products using said generated forecast price for distributing each of said predetermined number of present auction commodity products to one of said physical auction sites prior to auctioning said present auction commodity product at said auction site.

2. The method of claim 1, wherein said step of generating an auction forecast price comprises the steps of:

obtaining retail market performance data for one or more past retail commodity products sold at one or more retail sites;

obtaining regional data relevant to said one or more retail sites;

performing a regional trend analysis of sales for said one or more past retail commodity products using said retail market performance data and said regional data;

performing a seasonality analysis for said one or more past auction commodity products;

generating a time-series model for said one or more past retail commodity products using said regional trend analysis and said seasonality analysis; and determining a price-level adjustment for said predetermined number of present auction commodity products based on said elasticity computations and said time-series model.

3. The method of claim 2, wherein said step of obtaining regional data relevant to said one or more retail sites comprises the steps of:

retrieving local unemployment data;
retrieving gross product growth data; and
retrieving population growth data.

4. The method of claim 2, wherein said step of performing a regional trend analysis comprises the step of determining a profit margin and a time-to-turn for said one or more past retail commodity products using said retrieved retail market performance data.

5. The method of claim 2, wherein said step of performing a seasonality analysis comprises the step of quantifying a seasonal effect on a past auction commodity price paid for said one or more past auction commodity products.

6. The method of claim 1, wherein said step of performing one or more elasticity computations comprises the step of determining a self-price elasticity value representing a percentage decrease in said past auction commodity price paid for a first one of said one or more past auction commodity products due to a percentage increase in auction volume of a second one of said past auction commodity products, said first and second past auction commodity products having the same commodity model type and the same commodity model year.

7. The method of claim 6, wherein said step of performing one or more elasticity computations further comprises the step of determining a cross-price elasticity value representing a percentage decrease in said past auction commodity price paid for said first one of said one or more past auction commodity products due to a percentage increase in auction volume of a third one of said one or more past auction commodity products, wherein said first and third past auction commodity products have different commodity model types.

8. The method of claim 7, wherein said step of performing one or more elasticity computations further comprises the step of determining a cross-price elasticity value representing a percentage decrease in said past auction commodity price for said first one of said one or more past auction commodity products due to a percentage increase in auction volume of a fourth one of said one or more past auction commodity products, wherein said first and fourth past auction commodity products have a different commodity model year.

9. The method of claim 2, further comprising the step of obtaining present auction commodity description data for said predetermined number of present auction commodity products.

10. The method of claim 9, wherein said step of obtaining present auction commodity description data includes the steps of:
 obtaining a present commodity usage measurement for said predetermined number of present auction commodity products;
 obtaining one or more present optional features associated with said predetermined number of present auction commodity products; and
 obtaining a present auction type associated with said predetermined number of present auction commodity products.

11. The method of claim 10, further comprising the step of obtaining past auction commodity description data for said one or more past auction commodity products.

12. The method of claim 11, wherein said step of obtaining past auction commodity description data includes the steps of:
 obtaining a past commodity usage measurement for said one or more past auction commodity products;
 obtaining one or more past optional features associated with said one or more past auction commodity products; and
 obtaining a past auction type associated with said one or more past auction commodity products.

13. The method of claim 12, further comprising the step of determining an initial forecast auction commodity price for each of said predetermined number of present auction commodity products using said past auction commodity description data and said present auction commodity description data.

14. The method of claim 13, wherein said step of determining an initial forecast auction commodity price for each of said predetermined number of present auction commodity products includes the steps of:
 performing a usage measurement depreciation analysis;
 performing a commodity optional feature analysis; and
 performing an auction type analysis.

15. The method of claim 14, wherein said step of performing a usage measurement depreciation analysis comprises the steps of:
 defining one or more past commodity product groups, wherein each of said one or more past commodity product groups is representative of said one or more past auction commodity products that have the same commodity model type and the same commodity model year; and
 generating a usage measurement deduction curve for each of said one or more past auction commodity product groups.

16. The method of claim 15, wherein said step of generating a usage measurement deduction curve comprises using said past auction commodity usage measurements associated with said past commodity product group to generate said usage measurement deduction curve.

17. The method of claim 15, wherein said step of determining an initial forecast auction commodity price further comprises the step of determining a usage measurement deduction for said predetermined number of present auction commodity products using said generated usage measurement deduction curve for said past commodity product group having the same commodity model type and the same commodity model year as said predetermined number of present auction commodity products.

18. The method of claim 15, wherein said step of performing a commodity optional feature analysis comprises the steps of:
 defining one or more past commodity product feature groups, wherein each of said one or more past commodity product feature groups is representative of said one or more past auction commodity products that have the same past optional features; and
 generating a past commodity product feature model for each of said one or more past commodity product feature groups.

19. The method of claim 18, wherein said step of performing an auction type analysis comprises the steps of:
 defining one or more past auction type groups, wherein said one or more past auction type groups is representative of said one or more past auction commodity products that are associated with the same past auction type; and
 generating a past auction type model for each of said one or more past auction type groups.

20. The method of claim 19, wherein said step of determining an initial forecast auction commodity price for each of said predetermined number of present auction commodity products includes the steps of:
 determining a confidence distance between said predetermined number of present auction commodity products and said one or more past auction commodity products;
 assigning a confidence weight to said one or more past auction commodity products based on said determined confidence distance; and
 setting said initial auction forecast price for said predetermined number of present auction commodity products equal to a weighted average of said past auction price paid for said one or more past auction commodity products using said assigned confidence weight.

21. The method of claim 20, further comprising the step of retrieving present retail market condition data, present commodity product demand data based on seasonal changes, present commodity product supply data, and present auction volume data.

22. The method of claim 21, wherein said step of generating an auction forecast price step generates said auction forecast price by adjusting said set initial auction forecast price for said predetermined number of present auction commodity products using said determined price level adjustments, said present retail market condition data, said present commodity product demand data, said present commodity product supply data, and said present auction volume data.

23. The method of claim 22, wherein said step of generating an optimized auction commodity distribution plan comprises the steps of:
 obtaining optimization data, said optimization data including said generated forecast price for each of said predetermined number of present auction commodity products, said present auction commodity product description data, a shipping cost, a shipping time, a time-value adjustment, a current inventory listing for each of said one or more physical auction sites, a capacity constraint for each of said one or more physical auction sites, and a local elasticity measurement for each of said one or more physical auction sites;

obtaining one or more optimization parameters, said optimization parameters including a population size, one or more genetic operators, and a maximum iteration number;

representing an initial auction commodity distribution plan as a genome, where said genome is an array of one or more commodity product objects and further wherein each of said commodity objects is comprised of said present commodity description data for one of said present auction commodity products, a source location, and a target location;

generating a number of first generation genomes, said number being equal to said population size;

determining a first fitness value for each commodity product object in each genome of said first generation genomes;

determining a second fitness value for each respective genome by adding said determined first fitness values together; and evolving said first generation of genomes.

24. The method of claim 23, wherein said step of evolving comprises the steps of:

selecting one of said one or more genetic operators;

selecting one or more of said first generation genomes to modify based on said determined second fitness value;

modifying said selected one or more first generation genomes using said selected genetic operator, thereby producing one or more modified genomes;

determining a third fitness value for each of said one or more modified genomes;

randomly selecting one of said one or more modified genomes based on a probability value; and generating an evolved generation of genomes that includes said selected modified genome and repeating said evolving step until a stop condition is satisfied.

25. The method of claim 24, wherein said first and third fitness values are determined by calculating a fitness value for each of the predetermined number of present auction commodity products, which is a function of a forecasted price, a shipping cost, an asset carrying cost, and an elasticity.

26. The method of claim 25 wherein said stop condition is satisfied when a convergence threshold is satisfied or when said maximum iteration number is exceeded.

27. The method of claim 26, wherein after said stop condition is satisfied, said evolved generation of genomes is selected as said optimized auction commodity distribution plan.

28. The method of claim 27, further comprising the step of outputting said optimized auction commodity distribution plan.

29. A system for generating an optimized auction commodity distribution plan for a predetermined number of present auction commodity products, comprising:

means for performing one or more elasticity computations for one or more past auction commodity products sold at one or more physical auction sites;

means for generating an auction forecast price for each of said predetermined number of present auction commodity products to be auctioned at said one or more physical auction sites using said one or more elasticity computations, wherein each of said present auction commodity products and said past commodity products have an associated commodity model type and a commodity model year; and means for generating an optimized auction commodity distribution plan for said predetermined number of present auction commodity products using said generated forecast price for distributing each of said predetermined number of present auction commodity products to one of said physical auction sites prior to auctioning said present auction commodity product at said auction site.

30. The system of claim 29, wherein said means for generating an auction forecast price comprises:

means for obtaining retail market performance data for one or more past retail commodity products sold at one or more retail sites;

means for obtaining regional data relevant to said one or more retail sites;

means for performing a regional trend analysis of sales for said one or more past retail commodity products using said retail market performance data and said regional data;

means for performing a seasonality analysis for said one or more past auction commodity products;

means for generating a time-series model for said one or more past retail commodity products using said regional trend analysis and said seasonality analysis; and means for determining a price-level adjustment for said predetermined number of present auction commodity products based on said elasticity computations and said time-series model.

31. The system of claim 30, wherein said means for obtaining regional data relevant to said one or more retail sites comprises:

means for retrieving local unemployment data;

means for retrieving gross product growth data; and means for retrieving population growth data.

32. The system of claim 30, wherein said means for performing a regional trend analysis comprises means for determining a profit margin and a time-to-turn for said one or more past retail commodity products using said retrieved retail market performance data.

33. The system of claim 30, wherein said means for performing a seasonality analysis comprises means for quantifying a seasonal effect on a past auction commodity price paid for said one or more past auction commodity products.

34. The system of claim 29, wherein said means for performing one or more elasticity computations comprises means for determining a self-price elasticity value representing a percentage decrease in said past auction commodity price paid for a first one of said one or more past auction commodity products due to a percentage increase in auction volume of a second one of said past auction commodity products, said first and second past auction commodity products having the same commodity model type and the same commodity model year.

35. The system of claim 34, wherein said means for performing one or more elasticity computations further comprises means for determining a cross-price elasticity value representing a percentage decrease in said past auction commodity price paid for said first one of said one or more past auction commodity products due to a percentage increase in auction volume of a third one of said one or more past auction commodity products, wherein said first and third past auction commodity products have different commodity model types.

36. The system of claim 35, wherein said means for performing one or more elasticity computations further comprises means for determining a cross-price elasticity value representing a percentage decrease in said past auction commodity price paid for said first one of said one or more past auction commodity products due to a percentage increase in auction volume of a fourth one of said one or more past auction commodity products, wherein said first and fourth past auction commodity products have a different commodity model year.

37. The system of claim 30, further comprising means for obtaining present auction commodity description data for said predetermined number of present auction commodity products.

38. The system of claim 37, wherein said means for obtaining present auction commodity description data includes:
means for obtaining a present commodity usage measurement for said predetermined number of present auction commodity products;
means for obtaining one or more present optional features associated with said predetermined number of present auction commodity products; and
means for obtaining a present auction type associated with said predetermined number of present auction commodity products.

39. The system of claim 38, further comprising means for obtaining past auction commodity description data for said one or more past auction commodity products.

40. The system of claim 39, wherein said means for obtaining past auction commodity description data includes:
means for obtaining a past commodity usage measurement for said one or more past auction commodity products;
means for obtaining one or more past optional features associated with said one or more past auction commodity products; and
means for obtaining a past auction type associated with said one or more past auction commodity products.

41. The system of claim 40, further comprising means for determining an initial forecast auction commodity price for each of said predetermined number of present auction commodity products using said past auction commodity description data and said present auction commodity description data.

42. The system of claim 41, wherein said means for determining an initial forecast auction commodity price for each of said predetermined number of present auction commodity products includes:
means for performing a usage measurement depreciation analysis;
means for performing a commodity optional feature analysis; and
means for performing an auction type analysis.

43. The system of claim 42, wherein said means for performing a usage measurement depreciation analysis comprises:
means for defining one or more past commodity product groups, wherein each of said one or more past commodity product groups is representative of said one or more past auction commodity products that have the same commodity model type and the same commodity model year; and
means for generating a usage measurement deduction curve for each of said one or more past auction commodity product groups.

44. The system of claim 43, wherein said means for generating a usage measurement deduction curve comprises using said past auction commodity usage measurements associated with said past commodity product group to generate said usage measurement deduction curve.

45. The system of claim 43, wherein said means for determining an initial forecast auction commodity price further comprises means for determining a usage measurement deduction for said predetermined number of present auction commodity products using said generated usage measurement deduction curve for said past commodity product group having the same commodity model type and the same commodity model year as said predetermined number of present auction commodity products.

46. The system of claim 43, wherein said means for performing a commodity optional feature analysis comprises:
means for defining one or more past commodity product feature groups, wherein each of said one or more past commodity product feature groups is representative of said one or more past auction commodity products that have the same past optional features; and
means for generating a past commodity product feature model for each of said one or more past commodity product feature groups.

47. The system of claim 46, wherein said means for performing an auction type analysis comprises:
means for defining one or more past auction type groups, wherein said one or more past auction type groups is representative of said one or more past auction commodity products that are associated with the same past auction type; and
means for generating a past auction type model for each of said one or more past auction type groups.

48. The system of claim 47, wherein said means for determining an initial forecast auction commodity price for each of said predetermined number of present auction commodity products includes:
means for determining a confidence distance between said predetermined number of present auction commodity products and said one or more past auction commodity products;
means for assigning a confidence weight to said one or more past auction commodity products based on said determined confidence distance; and
means for setting said initial auction forecast price for said predetermined number of present auction commodity products equal to a weighted average of said past auction price paid for said one or more past auction commodity products using said assigned confidence weight.

49. The system of claim 48, further comprising means for retrieving present retail market condition data, present commodity product demand data based on seasonal changes, present commodity product supply data, and present auction volume data.

50. The system of claim 49, wherein said means for generating an auction forecast price comprises means for adjusting said set initial auction forecast price for said predetermined number of present auction commodity products using said determined price level adjustments, said present retail market condition data, said present commodity product demand data, said present commodity product supply data, and said present auction volume data.

51. The system of claim 50, wherein said means for generating an optimized auction commodity distribution plan comprises:
means for obtaining optimization data, said optimization data including said generated forecast price for each of said predetermined number of present auction commodity products, said present auction commodity product description data, a shipping cost, a shipping time, a time-value adjustment, a current inventory listing for each of said one or more physical auction sites, a capacity constraint for each of said one or more physical auction sites, and a local elasticity measurement for each of said one or more physical auction sites;

means for obtaining one or more optimization parameters, said optimization parameters including a population size, one or more genetic operators, and a maximum iteration number;

means for representing an initial auction commodity distribution plan as a genome, where said genome is an array of one or more commodity product objects and further wherein each of said commodity objects is comprised of said present commodity description data for one of said present auction commodity products, a source location, and a target location;

means for generating a number of first generation genomes, said number being equal to said population size;

means for determining a first fitness value for each commodity product object in each genome of said first generation genomes;

means for determining a second fitness value for each respective genome by adding said determined first fitness values together; and means for evolving said first generation of genomes.

52. The system of claim 51, wherein said means for evolving said first generation of genomes comprises:

means for selecting one of said one or more genetic operators;

means for selecting one or more of said first generation genomes to modify based on said determined second fitness value;

means for modifying said selected one or more first generation genomes using said selected genetic operator, thereby producing one or more modified genomes;

means for determining a third fitness value for each of said one or more modified genomes;

means for randomly selecting one of said one or more modified genomes based on a probability value; and means for generating an evolved generation of genomes that includes said selected modified genome and repeating said evolving step until a stop condition is satisfied.

53. The system of claim 52, wherein said first and third fitness values are determined by calculating a fitness value for each of the predetermined number of present auction commodity products, which is a function of a forecasted price, a shipping cost, an asset carrying cost, and an elasticity.

54. The system of claim 53 wherein said stop condition is satisfied when a convergence threshold is satisfied or when said maximum iteration number is exceeded.

55. The system of claim 53, wherein after said stop condition is satisfied, said evolved generation of genomes is selected as said optimized auction commodity distribution plan.

56. The system of claim 55, further comprising means for outputting said optimized auction commodity distribution plan.

57. A computer program product embodied on a computer useable medium comprising computer program logic stored therein for generating an optimized auction commodity distribution plan for a predetermined number of present auction commodity products, the computer program logic comprising:

computer readable program code means for performing one or more elasticity computations for one or more past auction commodity products sold at one or more physical auction sites;

computer readable program code means for generating an auction forecast price for each of said predetermined number of present auction commodity products to be auctioned at said one or more physical auction sites using said one or more elasticity computations, wherein each of said present auction commodity products and said past commodity products have an associated commodity model type and a commodity model year; and computer readable program code means for generating an optimized auction commodity distribution plan for said predetermined number of present auction commodity products using said generated forecast price for distributing each of said predetermined number of present auction commodity products to one of said physical auction sites prior to auctioning said present auction commodity product at said auction site.

58. The computer program product of claim 57, wherein said computer readable program code means for generating an auction forecast price comprises:

computer readable program code means for obtaining retail market performance data for one or more past retail commodity products sold at one or more retail sites; computer readable program code means for obtaining regional data relevant to said one or more retail sites;

computer readable program code means for performing a regional trend analysis of sales for said one or more past retail commodity products using said retail market performance data and said regional data;

computer readable program code means for performing a seasonality analysis for said one or more past auction commodity products;

computer readable program code means for generating a time-series model for said one or more past retail commodity products using said regional trend analysis and said seasonality analysis; and computer readable program code means for determining a price-level adjustment for said predetermined number of present auction commodity products based on said elasticity computations and said time-series model.

59. The computer program product of claim 58, wherein said computer readable program code means for obtaining regional data relevant to said one or more retail sites comprises:

computer readable program code means for retrieving local unemployment data;

computer readable program code means for retrieving gross product growth data; and computer readable program code means for retrieving population growth data.

60. The computer program product of claim 59, wherein said computer readable program code means for performing a regional trend analysis comprises computer readable program code means for determining a profit margin and a time-to-turn for said one or more past retail commodity products using said retrieved retail market performance data.

61. The computer program product of claim 58, wherein said computer readable program code means for performing a seasonality analysis comprises computer readable program code means for quantifying a seasonal effect on a past auction commodity price paid for said one or more past auction commodity products.

62. The computer program product of claim 57, wherein said computer readable program code means for performing one or more elasticity computations comprises computer readable program code means for determining a self-price elasticity value representing a percentage decrease in said past auction commodity price paid for a first one of said one or more past auction commodity products due to a percentage increase in auction volume of a second one of said past auction commodity products, said first and second past auction commodity products having the same commodity model type and the same commodity model year.

63. The computer program product of claim 62, wherein said computer readable program code means for performing one or more elasticity computations further comprises computer readable program code means for determining a cross-price elasticity value representing a percentage decrease in said past auction commodity price paid for said first one of said one or more past auction commodity products due to a percentage increase in auction volume of a third one of said one or more past auction commodity products, wherein said first and third past auction commodity products have different commodity model types.

64. The computer program product of claim 63, wherein said computer readable program code means for performing one or more elasticity computations further comprises computer readable program code means for determining a cross-price elasticity value representing a percentage decrease in said past auction commodity price for said first one of said one or more past auction commodity products due to a percentage increase in auction volume of a fourth one of said one or more past auction commodity products, wherein said first and fourth past auction commodity products have a different commodity model year.

65. The computer program product of claim 58, further comprising computer readable program code means for obtaining present auction commodity description data for said predetermined number of present auction commodity products.

66. The computer program product of claim 65, wherein said computer readable program code means for obtaining present auction commodity description data includes:
    computer readable program code means for obtaining a present commodity usage measurement for said predetermined number of present auction commodity products;
    computer readable program code means for obtaining one or more present optional features associated with said predetermined number of present auction commodity products; and
    computer readable program code means for obtaining a present auction type associated with said predetermined number of present auction commodity products.

67. The computer program product of claim 66, further comprising computer readable program code means for obtaining past auction commodity description data for said one or more past auction commodity products.

68. The computer program product of claim 67, wherein said computer readable program code means for obtaining past auction commodity description data includes:
    computer readable program code means for obtaining a past commodity usage measurement for said one or more past auction commodity products;
    computer readable program code means for obtaining one or more past optional features associated with said one or more past auction commodity products; and
    computer readable program code means for obtaining a past auction type associated with said one or more past auction commodity products.

69. The computer program product of claim 68, further comprising computer readable program code means for determining an initial forecast auction commodity price for each of said predetermined number of present auction commodity products using said past auction commodity description data and said present auction commodity description data.

70. The computer program product of claim 69, wherein said computer readable program code means for determining an initial forecast auction commodity price for each of said predetermined number of present auction commodity products includes:
    computer readable program code means for performing a usage measurement depreciation analysis;
    computer readable program code means for performing a commodity optional feature analysis; and
    computer readable program code means for performing an auction type analysis.

71. The computer program product of claim 70, wherein said computer readable program code means for performing a usage measurement depreciation analysis comprises:
    computer readable program code means for defining one or more past commodity product groups, wherein each of said one or more past commodity product groups is representative of said one or more past auction commodity products that have the same commodity model type and the same commodity model year; and
    computer readable program code means for generating a usage measurement deduction curve for each of said one or more past auction commodity product groups.

72. The computer program product of claim 71, wherein said computer readable program code means for generating a usage measurement deduction curve comprises computer readable program code means for using said past auction commodity usage measurements associated with said past commodity product group to generate said usage measurement deduction curve.

73. The computer program product of claim 71, wherein said computer readable program code means for determining an initial forecast auction commodity price further comprises computer readable program code means for determining a usage measurement deduction for said predetermined number of present auction commodity products using said generated usage measurement deduction curve for said past commodity product group having the same commodity model type and the same commodity model year as said predetermined number of present auction commodity products.

74. The computer program product of claim 71, wherein said computer readable program code means for performing a commodity optional feature analysis comprises:
    computer readable program code means for defining one or more past commodity product feature groups, wherein each of said one or more past commodity product feature groups is representative of said one or more past auction commodity products that have the same past optional features; and
    computer readable program code means for generating a past commodity product feature model for each of said one or more past commodity product feature groups.

75. The computer program product of claim 74, wherein said computer readable program code means for performing an auction type analysis comprises:
    computer readable program code means for defining one or more past auction type groups, wherein said one or more past auction type groups is representative of said one or more past auction commodity products that are associated with the same past auction type; and
    computer readable program code means for generating a past auction type model for each of said one or more past auction type groups.

76. The computer program product of claim 75, wherein said computer readable program code means for determining an initial forecast auction commodity price for each of said predetermined number of present auction commodity products includes:

computer readable program code means for determining a confidence distance between said predetermined number of present auction commodity products and said one or more past auction commodity products;

computer readable program code means for assigning a confidence weight to said one or more past auction commodity products based on said determined confidence distance; and computer readable program code means for setting said initial auction forecast price for said predetermined number of present auction commodity products equal to a weighted average of said past auction price paid for said one or more past auction commodity products using said assigned confidence weight.

77. The computer program product of claim 76, further comprising computer readable program code means for retrieving present retail market condition data, present commodity product demand data based on seasonal changes, present commodity product supply data, and present auction volume data.

78. The computer program product of claim 77, wherein said computer readable program code means for generating an auction forecast price comprises computer readable program code means for adjusting said set initial auction forecast price for said predetermined number of present auction commodity products using said determined price level adjustments, said present retail market condition data, said present commodity product demand data, said present commodity product supply data, and said present auction volume data.

79. The computer program product of claim 78, wherein said computer readable program code means for generating an optimized auction commodity distribution plan comprises:

computer readable program code means for obtaining optimization data, said optimization data including said generated forecast price for each of said predetermined number of present auction commodity products, said present auction commodity product description data, a shipping cost, a shipping time, a time-value adjustment, a current inventory listing for each of said one or more physical auction sites, a capacity constraint for each of said one or more physical auction sites, and a local elasticity measurement for each of said one or more physical auction sites;

computer readable program code means for obtaining one or more optimization parameters, said optimization parameters including a population size, one or more genetic operators, and a maximum iteration number;

computer readable program code means for representing an initial auction commodity distribution plan as a genome, where said genome is an array of one or more commodity product objects and further wherein each of said commodity objects is comprised of said present commodity description data for one of said present auction commodity products, a source location, and a target location;

computer readable program code means for generating a number of first generation genomes, said number being equal to said population size;

computer readable program code means for determining a first fitness value for each commodity product object in each genome of said first generation genomes;

computer readable program code means for determining a second fitness value for each respective genome by adding said determined first fitness values together; and computer readable program code means for evolving said first generation of genomes.

80. The computer program product of claim 79, wherein said computer readable program code means for evolving said first generation of genomes comprises:

computer readable program code means for selecting one of said one or more genetic operators;

computer readable program code means for selecting one or more of said first generation genomes to modify based on said determined second fitness value;

computer readable program code means for modifying said selected one or more first generation genomes using said selected genetic operator, thereby producing one or more modified genomes;

computer readable program code means for determining a third fitness value for each of said one or more modified genomes;

computer readable program code means for randomly selecting one of said one or more modified genomes based on a probability value; and computer readable program code means for generating an evolved generation of genomes that includes said selected modified genome and repeating said evolving step until a stop condition is satisfied.

81. The computer program product of claim 80, wherein said first and third fitness values are determined by calculating a fitness value for each of the predetermined number of present auction commodity products, which is a function of a forecasted price, a shipping cost, an asset carrying cost, and an elasticity.

82. The computer program product of claim 81 wherein said stop condition is satisfied when a convergence threshold is satisfied or when said maximum iteration number is exceeded.

83. The computer program product of claim 81, wherein after said stop condition is satisfied, said evolved generation of genomes is selected as said optimized auction commodity distribution plan.

84. The computer program product of claim 83, further comprising computer readable program code means for outputting said optimized auction commodity distribution plan.

85. A computer-implemented method for generating an optimized auction commodity distribution plan for a predetermined number of present auction commodity products to be auctioned at one or more of a plurality of physical auction sites, the method comprising the steps of:

performing one or more elasticity computations for a plurality of past auction commodity products sold at said plurality of physical auction sites;

generating, with a processor, an auction forecast price for each of said predetermined number of present auction commodity products for each of said plurality of physical auction sites using said one or more elasticity computations; and generating, with said processor, an optimized auction commodity distribution plan for said predetermined number of present auction commodity products using said generated forecast price, wherein said optimized auction commodity distribution plan is a plan for distributing each of said predetermined number of present auction commodity products to one of said plurality of physical auction sites prior to auctioning said present auction commodity product at said auction site.

86. The method of claim 1, wherein the optimized distribution plan is a plan for distributing each of said one or more present auction commodity products to one of said one or more auction sites prior to said auction commodity product being placed on auction.

87. The system of claim 29, wherein the optimized distribution plan is a plan for distributing each of said one or more present auction commodity products to one of said one or more auction sites prior to said auction commodity product being placed on auction.

88. The computer program product of claim 57, wherein the optimized distribution plan is a plan for distributing each of said one or more present auction commodity products to one of said one or more auction sites prior to said auction commodity product being placed on auction.

89. A computer-implemented method for generating an optimized auction commodity distribution plan for one or more present auction commodity products, comprising:
  a) obtaining retail transaction data of past retail commodity products sold at one or more of a plurality of retail sites;
  b) obtaining wholesale transaction data of past auction commodity products sold at one or more of a plurality of auction sites;
  c) analyzing, with a processor, said retail transaction data and said wholesale transaction data, said step of analyzing comprising:
    i) performing a regional trend analysis of sales for said past retail commodity products using said retail transaction data;
    ii) performing a seasonality analysis for said past retail commodity products;
    iii) generating a time-series model for said past retail commodity products using said regional trend analysis and said seasonality analysis;
    iv) determining a price-level adjustment for said one or more present auction commodity products based on said time-series model;
    v) generating a usage measurement depreciation model using said wholesale transaction data;
    vi) generating a commodity optional feature model using said wholesale transaction data;
    vii) generating an auction type model using said wholesale transaction data; and
    viii) performing one or more elasticity computations for said past auction commodity products;
  d) obtaining present auction commodity description data for said one or more present auction commodity products, said step of obtaining present auction commodity description data comprising:
    i) obtaining a present commodity usage measurement for said one or more present auction commodity products;
    ii) obtaining one or more present optional features associated with said one or more present auction commodity products; and
    iii) obtaining a present auction type associated with said one or more present auction commodity products;
  e) determining, with said processor, an initial forecast auction commodity price for each of said one or more present auction commodity products, said step of determining an initial forecast auction commodity price for each of said one or more present auction commodity products comprising:
    i) performing a usage measurement depreciation adjustment using said usage measurement depreciation model, said step of performing a usage measurement depreciation adjustment comprises the steps of:
      (a) defining one or more past commodity product groups, wherein each of said one or more past commodity product groups is representative of said one or more past auction commodity products that have a same commodity model type and a same commodity model year; and
      (b) generating a usage measurement deduction curve for each of said one or more past auction commodity product groups;
    ii) performing a commodity optional feature adjustment using said commodity optional feature model, said step of performing a commodity optional feature adjustment comprising:
      (a) defining one or more past commodity product feature groups, wherein each of said one or more past commodity product feature groups is representative of said one or more past auction commodity products that have the same past optional features; and
      (b) generating a past commodity product feature model for each of said one or more past commodity product feature groups; and
    iii) performing an auction type adjustment using said auction type model, said step of performing an auction type adjustment comprising:
      (a) defining one or more past auction type groups, wherein said one or more past auction type groups is representative of said one or more past auction commodity products that are associated with the same past auction type; and
      (b) generating a past auction type model for each of said one or more past auction type groups;
    iv) determining a confidence distance between said one or more present auction commodity products and said one or more past auction commodity products;
    v) assigning a confidence weight to said one or more past auction commodity products based on said determined confidence distance; and
    vi) setting said initial auction forecast price for said one or more present auction commodity products equal to a weighted average of said past auction price paid for said one or more past auction commodity products using said assigned confidence weight;
  f) retrieving present retail market condition data, present commodity product demand data based on seasonal changes, present commodity product supply data, and present auction volume data;
  g) generating a final auction forecast price by adjusting said set initial auction forecast price for said one or more present auction commodity products using said present retail market condition data, said present commodity product demand data, said present commodity product supply data, and said present auction volume data; and
  h) generating an optimized auction commodity distribution plan using optimization data, said optimization data comprising said generated forecast price for each of said one or more present auction commodity products, said present auction commodity product description data, a shipping cost, a shipping time, a time-value adjustment, a current inventory listing for each of said one or more auction sites, a capacity constraint for each of said one or more auction sites, and a local elasticity measurement for each of said one or more auction sites, said step of generating an optimized auction commodity distribution plan comprising:
    i) obtaining one or more optimization parameters, said optimization parameters including a population size, one or more genetic operators, and a maximum iteration number;

ii) representing an initial auction commodity distribution plan as a genome, wherein said genome is an array of one or more commodity product objects and further wherein each of said commodity objects is comprised of said present commodity description data for one of said present auction commodity products, a source location, and a target location;

iii) generating a number of first generation genomes, said number being equal to said population size;

iv) determining a first fitness value for each commodity product object in each genome of said first generation genomes;

v) determining a second fitness value for each respective genome by adding said determined first fitness values together; and vi) evolving said first generation of genomes.

90. The method of claim 89, wherein said step of evolving comprises the steps of:

selecting one of said one or more genetic operators;

selecting one or more of said first generation genomes to modify based on said determined second fitness value;

modifying said selected one or more first generation genomes using said selected genetic operator, thereby producing one or more modified genomes;

determining a third fitness value for each of said one or more modified genomes;

randomly selecting one of said one or more modified genomes based on a probability value; and generating an evolved generation of genomes that includes said selected modified genome and repeating said evolving step until a stop condition is satisfied.

91. The method of claim 90, wherein said first and third fitness values are determined by calculating a fitness value for each of the one or more present auction commodity products, which is a function of a forecasted price, a shipping cost, an asset carrying cost, and an elasticity.

92. The method of claim 91 wherein said stop condition is satisfied when a convergence threshold is satisfied or when said maximum iteration number is exceeded.

93. The method of claim 92, wherein after said stop condition is satisfied, said evolved generation of genomes is selected as said optimized auction commodity distribution plan.

94. The method of claim 93, further comprising the step of outputting said optimized auction commodity distribution plan.

* * * * *